(12) United States Patent
Morton et al.

(10) Patent No.: US 7,819,945 B2
(45) Date of Patent: Oct. 26, 2010

(54) METAL FLUORIDE TRAP

(75) Inventors: Richard Morton, San Diego, CA (US); Yoshiho Amada, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 224 days.

(21) Appl. No.: 12/261,737

(22) Filed: Oct. 30, 2008

(65) Prior Publication Data

US 2010/0107870 A1    May 6, 2010

(51) Int. Cl.
*B03C 3/36*    (2006.01)

(52) U.S. Cl. .......................... 95/78; 55/510; 55/DIG. 5; 55/DIG. 38; 96/60; 96/62; 96/69; 96/83; 96/98; 264/413; 264/480; 264/DIG. 48; 372/59

(58) Field of Classification Search .......... 95/59, 95/63, 78; 96/60, 62, 66, 69, 74, 83, 96, 96/98; 55/510, DIG. 5, DIG. 38; 264/413, 264/415, 479, 480, DIG. 48; 372/59
See application file for complete search history.

(56) References Cited

U.S. PATENT DOCUMENTS

| | | | | |
|---|---|---|---|---|
| 3,979,189 | A * | 9/1976 | Alskog | 96/58 |
| 4,077,785 | A * | 3/1978 | Hartshorn | 96/99 |
| 4,147,522 | A * | 4/1979 | Gonas et al. | 95/68 |
| 5,018,162 | A * | 5/1991 | Akins et al. | 372/57 |
| 5,029,177 | A * | 7/1991 | Akins et al. | 372/57 |
| 5,319,663 | A * | 6/1994 | Reid et al. | 372/59 |
| 6,152,988 | A * | 11/2000 | Plaks et al. | 95/58 |
| 6,442,181 | B1 * | 8/2002 | Oliver et al. | 372/25 |
| 6,865,210 | B2 * | 3/2005 | Ershov et al. | 372/55 |
| 6,869,467 | B2 * | 3/2005 | Scheuch | 96/55 |
| 6,911,144 | B2 * | 6/2005 | Van Pelt et al. | 210/232 |
| 7,522,650 | B2 * | 4/2009 | Partlo et al. | 372/59 |
| 2005/0226301 | A1 | 10/2005 | Partlo et al. | |
| 2006/0291517 | A1 * | 12/2006 | Gillespie et al. | 372/55 |
| 2007/0017371 | A1 * | 1/2007 | Furukawa et al. | 96/69 |
| 2007/0071058 | A1 * | 3/2007 | Amada et al. | 372/61 |
| 2010/0098120 | A1 * | 4/2010 | Ye et al. | 372/33 |
| 2010/0142582 | A1 * | 6/2010 | Sandstrom et al. | 372/62 |

FOREIGN PATENT DOCUMENTS

JP    6-152030 A   *   5/1994

* cited by examiner

*Primary Examiner*—Richard L Chiesa
(74) *Attorney, Agent, or Firm*—Martine Penilla & Gencarella, LLP

(57) ABSTRACT

A method for making a metal fluoride trap including: assembling a precipitation tube assembly including a plurality of precipitation tubes supported between a first tube end support and a second tube end support; assembling a precipitation tube, flowsheet and filter media assembly including: wrapping a flowsheet around at least one full circumference of the plurality of precipitation tubes, wherein the flowsheet has a width less than a length of the plurality of precipitation tubes between the first tube end support and the second tube end support; and wrapping a filter media around the wrapped flowsheet, wherein the filter media and the flowsheet are wrapped so as to have a diameter less than an inner diameter of an outer casing of the metal fluoride trap; inserting the precipitation tube, flowsheet and filter media assembly into the outer casing of the metal fluoride trap; allowing the flowsheet to expand; and pressing the filter media between the flowsheet and an inner surface of the outer casing of the metal fluoride trap. A method of filtering gas in a metal fluoride trap is also disclosed. A metal fluoride trap apparatus is also disclosed.

18 Claims, 17 Drawing Sheets

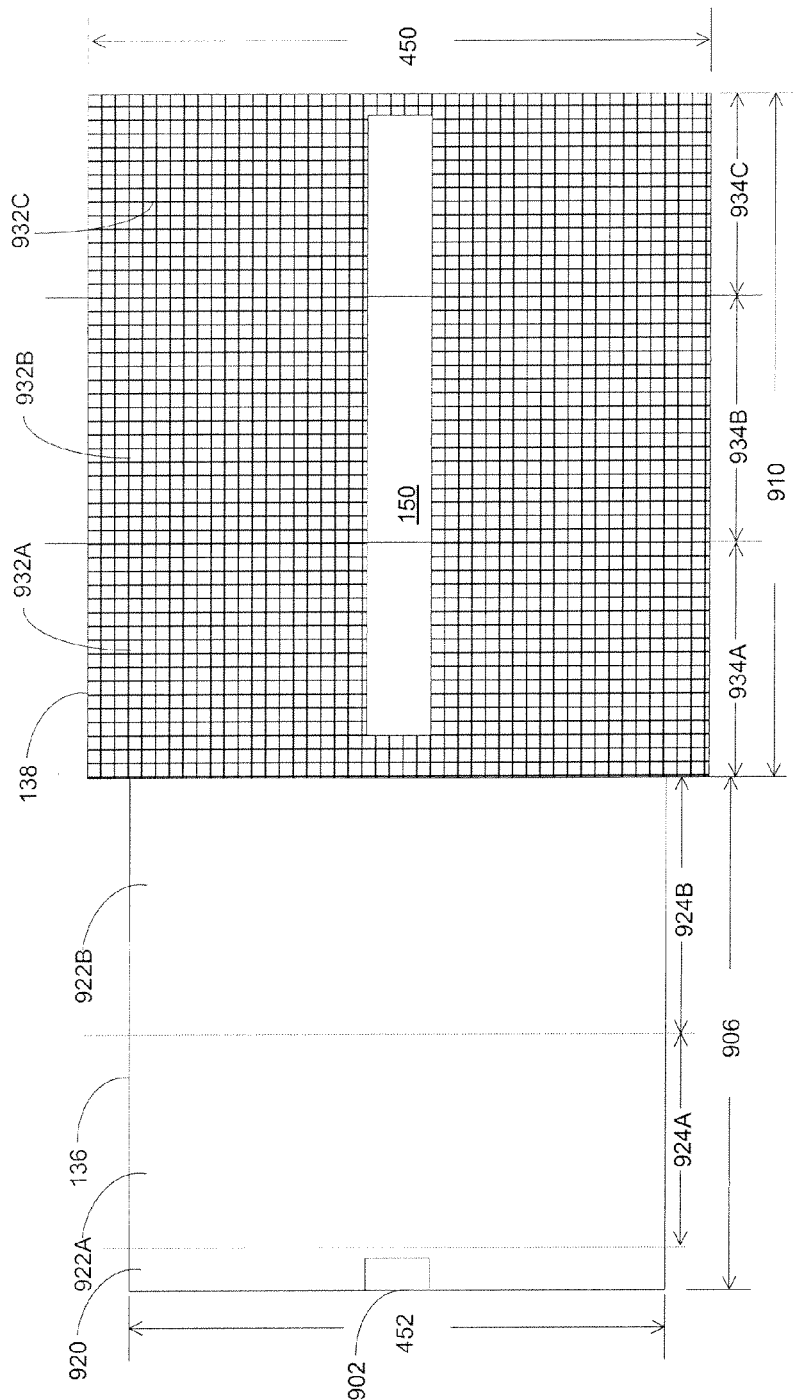
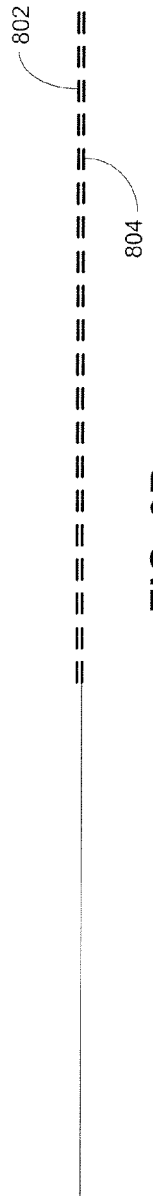
FIG. 9A
FIG. 9B

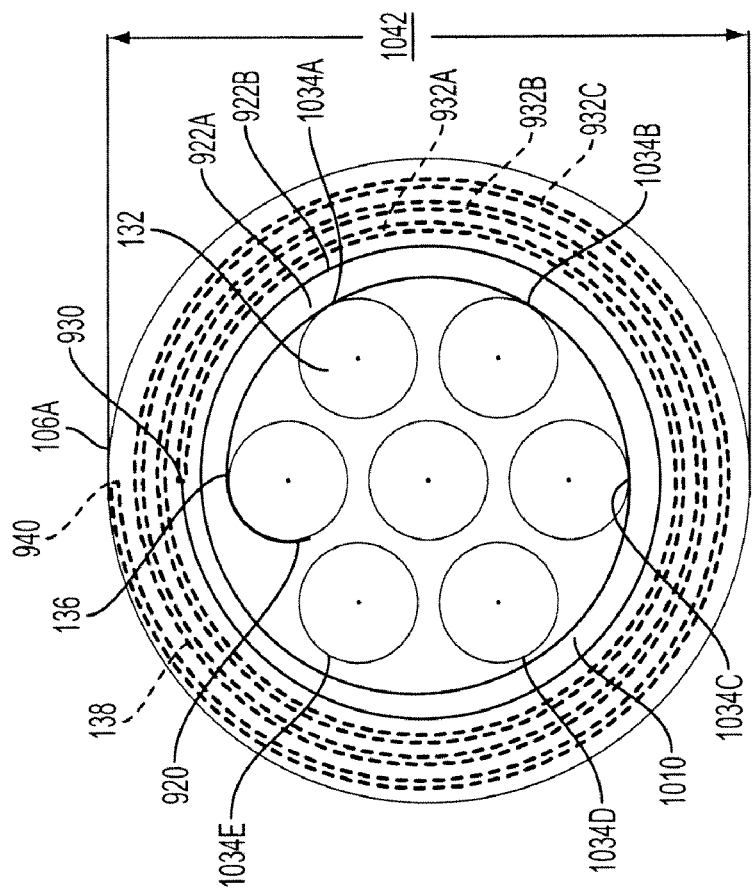
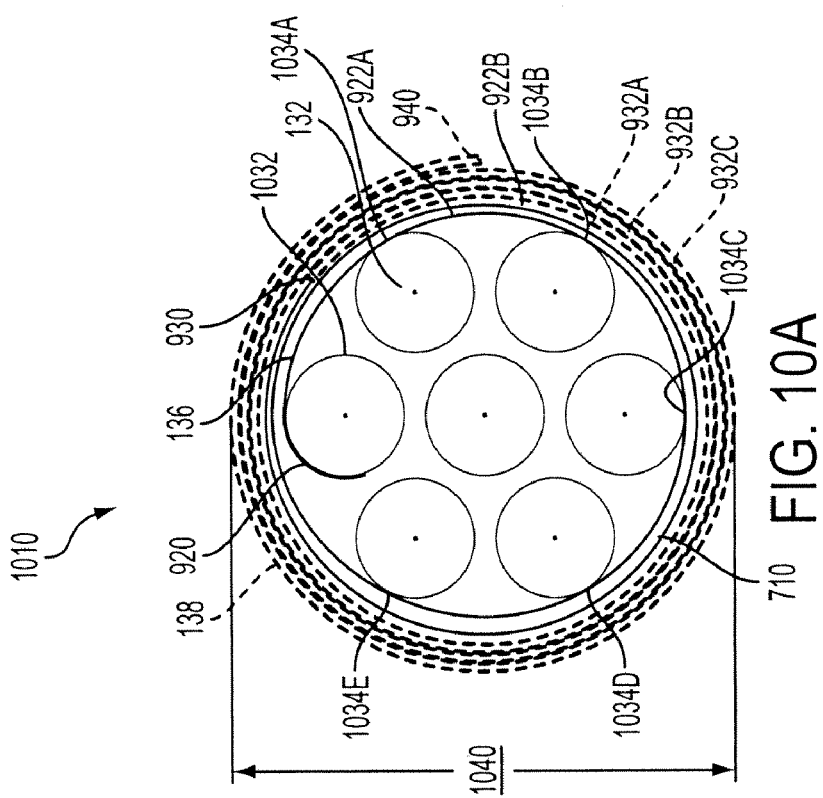
FIG. 10B
FIG. 10A

METAL FLUORIDE TRAP

BACKGROUND

The disclosed subject matter relates generally to gas discharge lasers, and more particularly, to methods and systems for increasing service life of a gas discharge laser chamber.

Electric discharge gas lasers are well known for utilization is such fields as integrated circuit photolithography manufacturing processes as DUV light sources. The advent of immersion photolithography has required manufacturers of such laser systems to offer lasers that can produce 60 to 90 Watts of average power and more, meaning the laser light source needs to operate at higher pulse repetition rates, for example 6 kHz or more. In addition, for cost of operation reasons users of such light sources are demanding longer and longer laser chamber lives, usually measured in number of pulses until the chamber has to be replaced. One proposal for longer chamber live is to utilize at least one of the electrodes, between which an electric discharge excites a lasing gas gain medium to cause lasing, which can erode for a longer period of time and still adequately support such an electric discharge. This results in more debris and metal fluoride particles, formed by the reaction of electrode materials with the fluorine gas usually forming part of the lasing gas over the life of the laser chamber.

Several particle trap mechanisms (e.g., particle removers) are included inside the gas discharge laser chamber. A metal fluoride trap ("MFT") has been used in such laser systems in the past as evidenced by U.S. Pat. Nos. 5,018,161 and 5,359,620, (i.e., '161 and '620 patents respectively) issued to Applicants' assignee Cymer, Inc., the disclosures of which are hereby incorporated by reference in their entirety for all purposes. The MFTs described in the '161 and '620 patents were primarily designed to generate a clean gas flow to and across the laser windows of the gas discharge laser chamber. The clean gas flow across the laser windows protects the windows from metal fluoride particle buildup. The MFTs described in the '161 and '620 patents were not designed for or intended to remove any significant portion of the particles present in the gas discharge laser chamber. The MFTs described in the '161 and '620 patents were especially not designed to extend service life of the gas discharge laser chamber of an order of magnitude or nearly so. In addition, particle traps have been used effectively, as evidenced by co-pending U.S. patent application Ser. No. 10/815,387, filed on Mar. 31, 2004, published on Oct. 13, 2005, Pub. No. 20050226301, the disclosure of which is hereby incorporated by reference in their entirety for all purposes. However such particle trap mechanisms are eventually saturated by the metal fluoride particles, leaving metal fluoride particles to circulate in the gas discharge laser chamber.

Lambda Physik utilizes a two stage filter as evidenced in U.S. Pat. No. 6,768,765, but without precipitation filters. GigaPhoton similarly uses an MFT of one stage which can be either a mesh filter or a precipitation filter as evidenced in U.S. Pat. Nos. 5,373,523 and 6,570,899. GigaPhoton Patent No. 7099365 utilizes a filter in a gas replenishment system connected to a laser chamber.

What is needed is to increase the service life of the gas discharge laser chamber is a higher particle trapping capacity of metal fluoride particles that can be removed from the gas flow. Applicants propose apparatus and methods to reduce the potentially very detrimental circulation of such metal fluoride particles in the gas discharge laser chamber, including reducing possible damage to the laser chamber windows and the possible reduction in discharge voltage required to produce a given pulse energy. These improvements can also provide a reduction in required gas circulation fan arc-free blower speed, especially at the elevated pulse repetition rates. Blower speed has limits bounded by vibration issues, power consumption limits and commensurate heat dissipation requirements.

SUMMARY

Broadly speaking, the disclosed subject matter fills these needs by providing an improved metal fluoride particle trap that has a greater particle capacity than previous metal fluoride particle trap designs. It should be appreciated that the disclosed subject matter can be implemented in numerous ways, including as a process, an apparatus, a system, or a device. Several aspects of embodiments of the disclosed subject matter are described below.

One embodiment of the disclosed subject matter provides a method for making a metal fluoride trap comprising: assembling a precipitation tube assembly including a plurality of precipitation tubes supported between a first tube end support and a second tube end support; assembling a precipitation tube, flowsheet and filter media assembly including: wrapping a flowsheet around at least one full circumference of the plurality of precipitation tubes, wherein the flowsheet has a width less than a length of the plurality of precipitation tubes between the first tube end support and the second tube end support; and wrapping a filter media around the wrapped flowsheet, wherein the filter media and the flowsheet are wrapped so as to have a diameter less than an inner diameter of an outer casing of the metal fluoride trap; inserting the precipitation tube, flowsheet and filter media assembly into the outer casing of the metal fluoride trap; allowing the flowsheet to expand; and pressing the filter media between the flowsheet and an inner surface of the outer casing of the metal fluoride trap.

Wrapping the flowsheet around at least one full circumference of the plurality of precipitation tubes can include wrapping the flowsheet around at least two full circumference of the plurality of precipitation tubes. Wrapping the flowsheet around at least one full circumference of the plurality of precipitation tubes can include forming at least two layers of flowsheet.

The filter media can include a sheet of filter media. The filter media can include a plurality of layers of filter media. The filter media can include a mesh filter media. The filter media can include a plurality of types of filter media. Each one of the plurality of types of filter media can have a corresponding one of a plurality of porosities. Wrapping the filter media can include wrapping alternating layers of each one of the plurality of types of filter media. Wrapping the filter media can include wrapping a plurality of layers of filter media. Wrapping the filter media can include wrapping at least six alternating layers of filter media.

The filter media can include a slot. The flowsheet can include a notch corresponding to an inlet on at least one of the plurality of precipitation tubes.

The filter media and the flowsheet are wrapped so as to have the diameter less than the inner diameter of the outer casing of the metal fluoride trap can include installing a clamp assembly and wherein allowing the flowsheet to expand can include releasing the clamp assembly.

Allowing the flowsheet to expand can include maintaining a tangential contact between the flowsheet and more than one of the plurality of precipitation tubes. Each one of the plurality of precipitation tubes can include at least one inlet in the center of the length of the precipitation tube.

Another embodiment of the disclosed subject matter provides a method of filtering gas in a metal fluoride trap comprising: inputting a gas flow into the metal fluoride trap; circulating the gas flow through a slot in a filter media inside the metal fluoride trap; flowing the gas through a filter media to a gap, wherein the gap is formed between a respective end of a flowsheet and a respective tube end support, wherein the filter media captures at least a portion of a quantity of particles in the gas flow; flowing the gas through a plurality of spaces formed between a plurality of precipitation tubes toward at least one inlet in each one of the plurality of precipitation tubes; flowing the gas into the at least one inlet in each one of the plurality of precipitation tubes; flowing the gas inside each one of the plurality of precipitation tubes; applying an electrical charge to the inner surface of each one of the plurality of precipitation tubes, wherein any remaining particles in the gas flow attach to the inside surface of each one of the plurality of precipitation tubes; and outputting a filtered gas flow from at least one outlet of the metal fluoride trap.

Another embodiment of the disclosed subject matter provides a metal fluoride trap comprising: a precipitation tube assembly including a plurality of precipitation tubes supported between a first tube end support and a second tube end support; a precipitation tube, flowsheet and filter media assembly including: a flowsheet wrapped around at least one full circumference of the plurality of precipitation tubes, wherein the flowsheet has a width less than a length of the plurality of precipitation tubes between the first tube end support and the second tube end support; and a filter media wrapped around the wrapped flowsheet, wherein the filter media and the flowsheet are wrapped so as to have a diameter less than an inner diameter of an outer casing of the metal fluoride trap; wherein the precipitation tube, flowsheet and filter media assembly are encased within the outer casing of the metal fluoride trap and wherein the filter media is pressed between the flowsheet and an inner surface of the outer casing of the metal fluoride trap.

Other aspects and advantages of the invention will become apparent from the following detailed description, taken in conjunction with the accompanying drawings, illustrating by way of example the principles of the disclosed subject matter.

BRIEF DESCRIPTION OF THE DRAWINGS

The present disclosed subject matter will be readily understood by the following detailed description in conjunction with the accompanying drawings.

FIGS. 9A and 9B are respectively a layout view and a side view accordance with aspects of embodiments of the disclosed subject matter.

FIG. 10A is a cross-sectional view of the multiple precipitation tubes, flowsheet and filter media, in accordance with aspects of embodiments of the disclosed subject matter.

FIG. 10B is a cross-sectional view of an improved MFT, in accordance with aspects of embodiments of the disclosed subject matter.

DETAILED DESCRIPTION

Several exemplary embodiments for an improved metal fluoride trap that has a greater particle capacity than previous metal fluoride trap designs will now be described. It will be apparent to those skilled in the art that the disclosed subject matter may be practiced without some or all of the specific details set forth herein.

Figure 1:
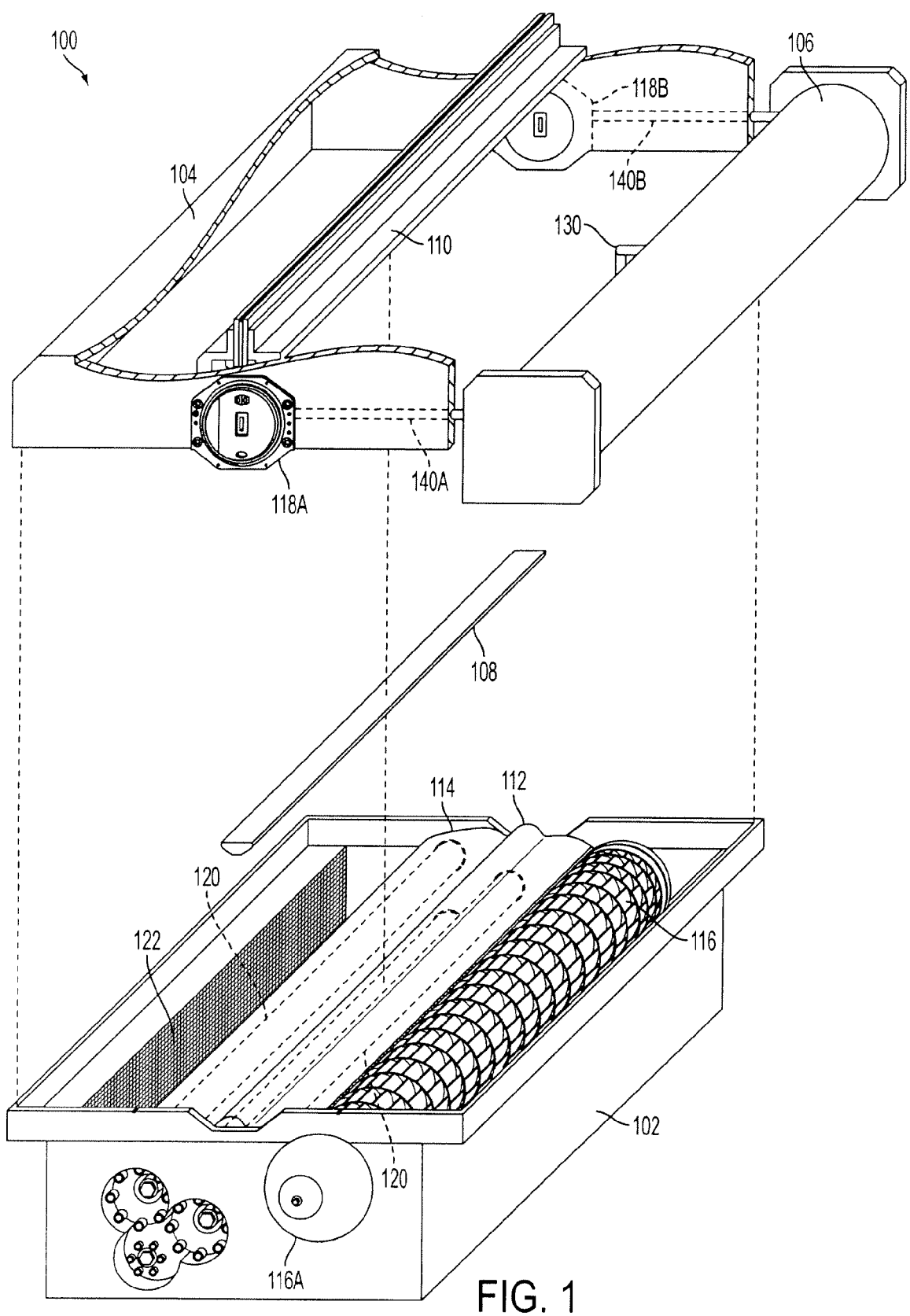
FIG. 1 is an expanded perspective view of a gas discharge laser chamber, in accordance with aspects of embodiments of the disclosed subject matter.

FIG. 1 is an expanded perspective view of a gas discharge laser chamber 100, in accordance with aspects of embodiments of the disclosed subject matter. The gas discharge laser chamber 100 includes a chamber body 102, a cover 104, a metal fluoride particle trap (MFT) 106, a first electrode 108, a first electrode support 110, a second electrode 112, a second electrode support 114, a fan 116, at least one fan motor 116A, at least one laser window 118A, 118B, multiple heat exchangers 120 and at least one chamber particle trap 122.

Figure 2:
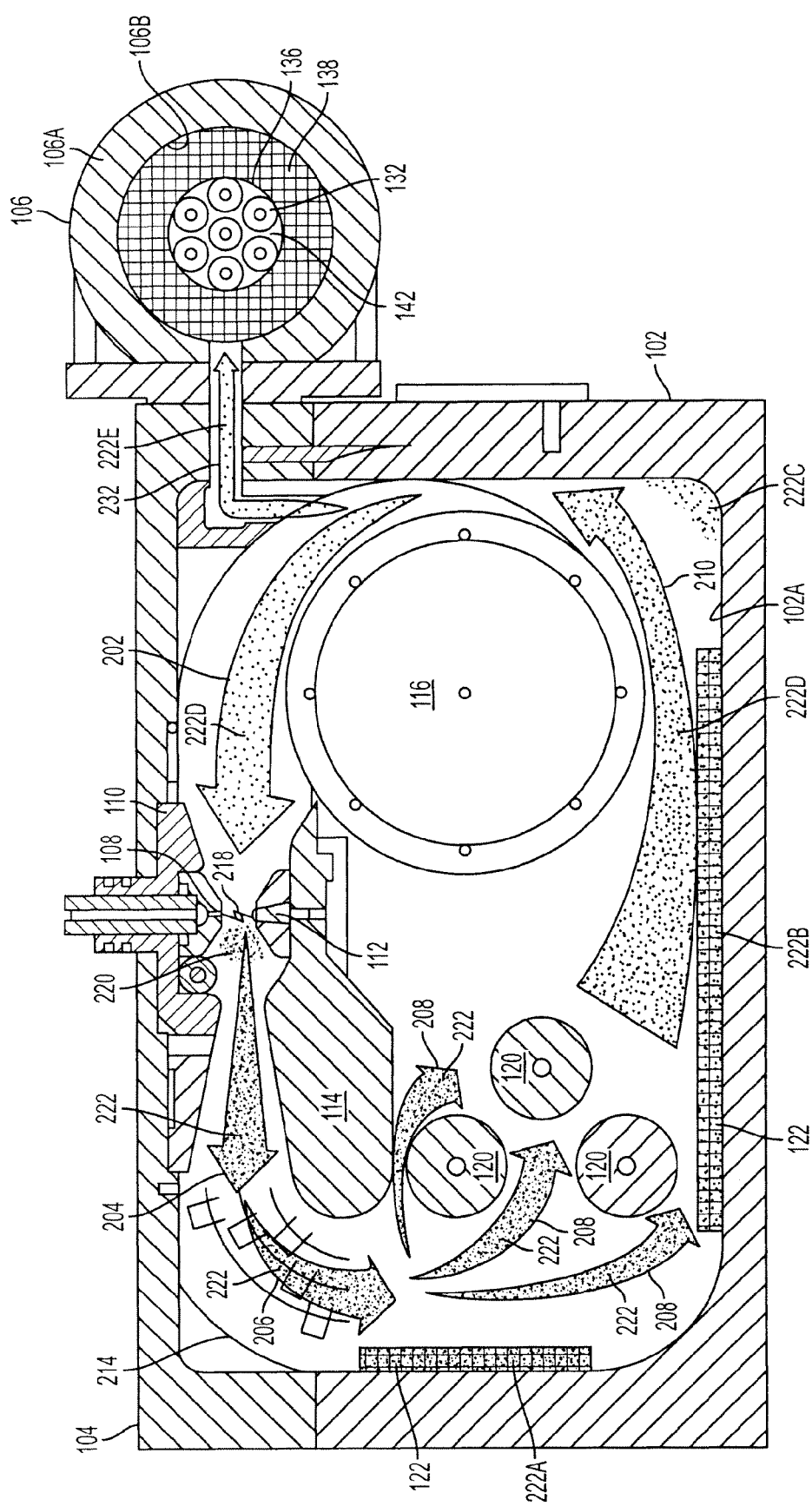
FIG. 2 is a side cross-sectional view of the gas discharge laser chamber, as viewed toward the end of the chamber containing the output pulse beam exit window of the laser chamber, in accordance with aspects of embodiments of the disclosed subject matter.

FIG. 2 is a side cross-sectional view of the gas discharge laser chamber 100, as viewed toward the end of the chamber containing the output pulse beam exit window of the laser chamber, in accordance with aspects of embodiments of the disclosed subject matter. The fan 116 continuously circulates gas through the gas discharge laser chamber 100. Beginning with the fan 116, the gas flow 202 is output from the fan and flows toward the discharge region 218 between the first electrode 108 and the second electrode 112. The gas flow 204 circulates through the discharge region 218 and toward the flow direction devices 214.

The gas flow 206 passes through the flow direction devices 214. From the flow direction devices 214, the gas flow 208 passes along the chamber particle traps 122 and over surfaces of the heat exchangers 120 and across additional particle trap screens 122 on the bottom of the chamber. The fan 116 draws the gas flow 210 into the fan for further recirculation.

Ions 220 are produced when the gas discharge laser discharges in the discharge region 218. The ions 220 bombard the electrodes and initiate formation of metal fluoride particles 222, which may also be charged, can be formed by the electrical discharge and are carried with the gas flow 204 and 206. As the gas flow 208 passes along the chamber particle traps 122 a first portion of the particles 222A and a second portion of the particles, 222B are captured in the respective chamber particle traps. A third portion of the particles 222C become attached to or simply settle on the inner surfaces 102A of the chamber and on the surfaces of the heat exchangers 120. A fourth portion of the particles 222D remain entrained in the gas flow 210 drawn into the fan 116 and are cycled through the fan to the output gas 202 flow. After passing by the heat exchangers, cooling the laser gas, most if not all or the ions will have decayed to an uncharged state forming fresh gas for a subsequent discharge in the discharge region 218, though still perhaps entrained with some particle debris such as metal fluoride particles.

A portion of the gas flow 232 output from the fan 116 flows into MFT inlet tube 130. The portion of the gas flow 232 flowing into the MFT inlet tube 130 includes a fifth portion of the particles 222E. The fifth portion of the particles 222E is trapped in the MFT 106, with essentially clean laser gas exiting the MPT for use for the purpose of keeping the laser chamber windows clean as explained in the above noted patents of applicants' assignee Cymer, Inc.

Figure 3:
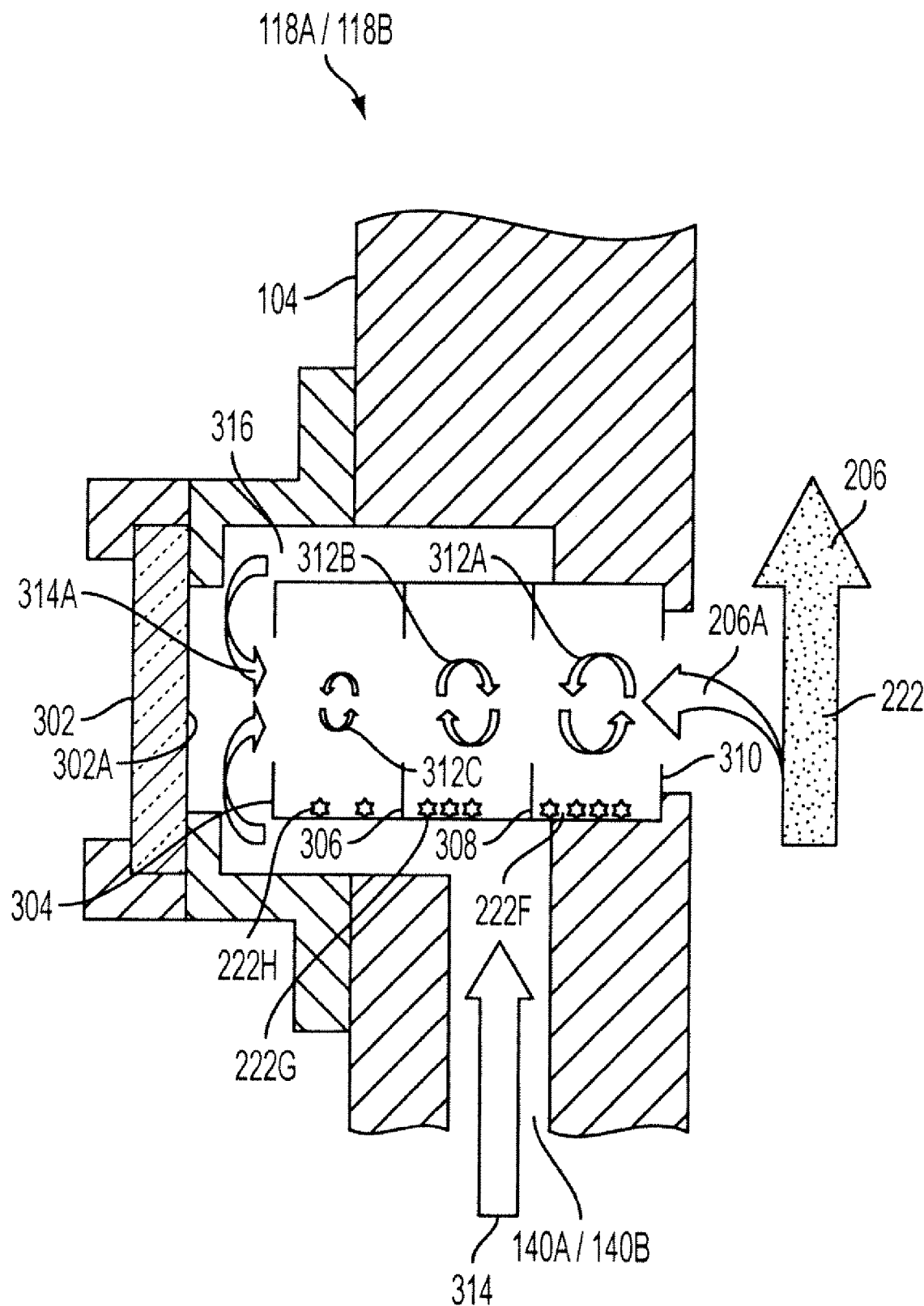
FIG. 3 is detailed sectional view of a laser window assembly, in accordance with aspects of embodiments of the disclosed subject matter.

FIG. 3 is detailed sectional view of a laser window assembly 118A, 118B, in accordance with aspects of embodiments of the disclosed subject matter. The laser window assembly 118A, 118B is mounted in the cover 104. The laser window assembly 118A, 118B includes the widow optical portion 302, baffles 304, 306, 308, 310 and a plenum 316.

Referring again to FIG. 1 and to FIG. 3, the gas discharge laser chamber 100 includes the MFT 106 to filter a portion of the gas flow 232 from the fan 116 and redirect the filtered gas flow 314 toward the laser windows 118A, 118B. The filtered gas flow 314 from the MFT 106 is directed through conduits 140A, 140B in the plenum 316 around the laser windows 118A, 118B. From the plenum 316 the gas flows toward the inner surface 302A of the optical portion 302 of the laser windows 118A, 118B. The optical portion 302 is contained within a laser window assembly 118A, 118B that reduces amount of unfiltered gas 206A and metal fluoride particles 222 that can flow toward the inner surface 302A of the optical portion 302 laser window 118A, 118B from the gas discharge laser chamber 100.

The window assembly 118A, 118B includes baffles 304, 306 and 308 that slow gas flow 206A from the gas discharge laser chamber 100 into eddies 312A, 312B, 312C. Metal fluoride particles 222F, 222G and 222H, entrained within the laser gas in the laser chamber 100 are caused to settle out in the baffles due in part to the gas flow eddies 312A, 312B, 312C and in part to the clean gas flow 314A from the plenum 316 toward the chamber 100. As a result, the metal fluoride particles 222F, 222G and 222H are prevented from reaching the inner surface 302A of the optical portion 302 of the laser window 118A, 118B. The filtered gas flow 314A from the inner surface 302A of the laser window can also carry at least a portion of the metal fluoride particles in the laser window assembly and in the gas flow eddies 312A, 312B and 312C away from the inner surface 302A of the window and back into the gas discharge laser chamber 100. The filtered gas 314 flow through the baffles 304, 306, 308, 310 slows the gas flow eddies 312C, 312B, 312A and further prevents particles from reaching the inner surface 302A of the optical portion 302. Unfortunately typical metal fluoride traps have a very limited metal fluoride particle capacity before it becomes saturated and metal fluoride particles are entrained in the gas flow 314 from the MFT which leads to metal fluoride particles settling on the inner surface 302A of the window assembly 118A, 118B. Typical metal fluoride traps were originally designed to create a source of clean gas 314 for protection of the optical portion 302 of the laser window 118A, 118B and not to remove most or all of the particles from the gas circulating in the gas discharge laser chamber 100. Similarly, the particle traps 122, which are described in more detail in the above referenced co-pending patent application of Applicants' assignee, Cymer, Inc., have been successful in removing metal fluoride particles and other debris, but are expected to exceed their capacity for removing metal fluoride particles and other debris as the service life of the gas discharge laser chamber 100 increases such as a service life in the tens of billions of pulses.

Figure 4A:
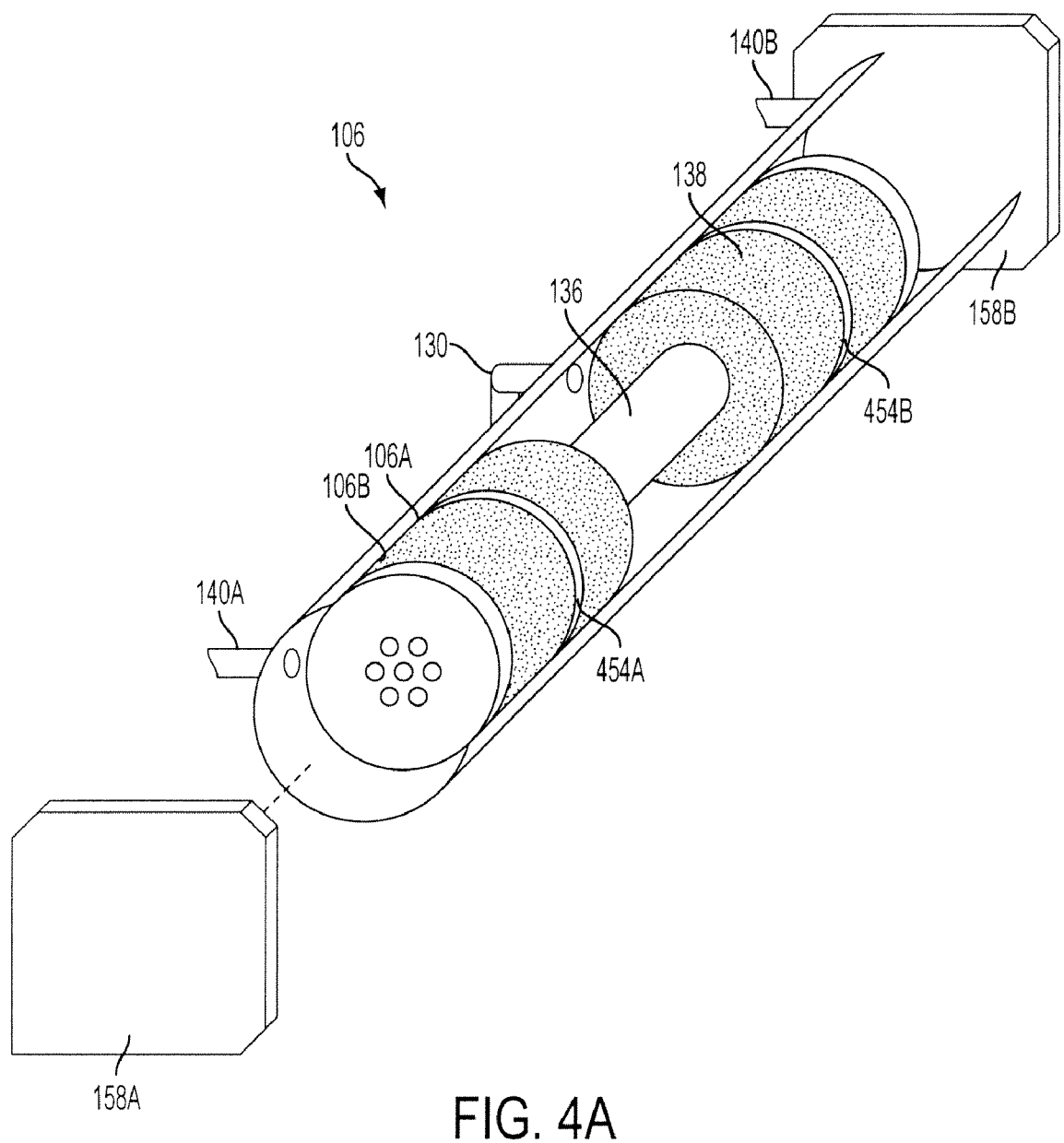
FIGS. 4A and 4B are cutaway perspective views of an improved MFT, in accordance with aspects of embodiments of the disclosed subject matter.
Figure 4B:
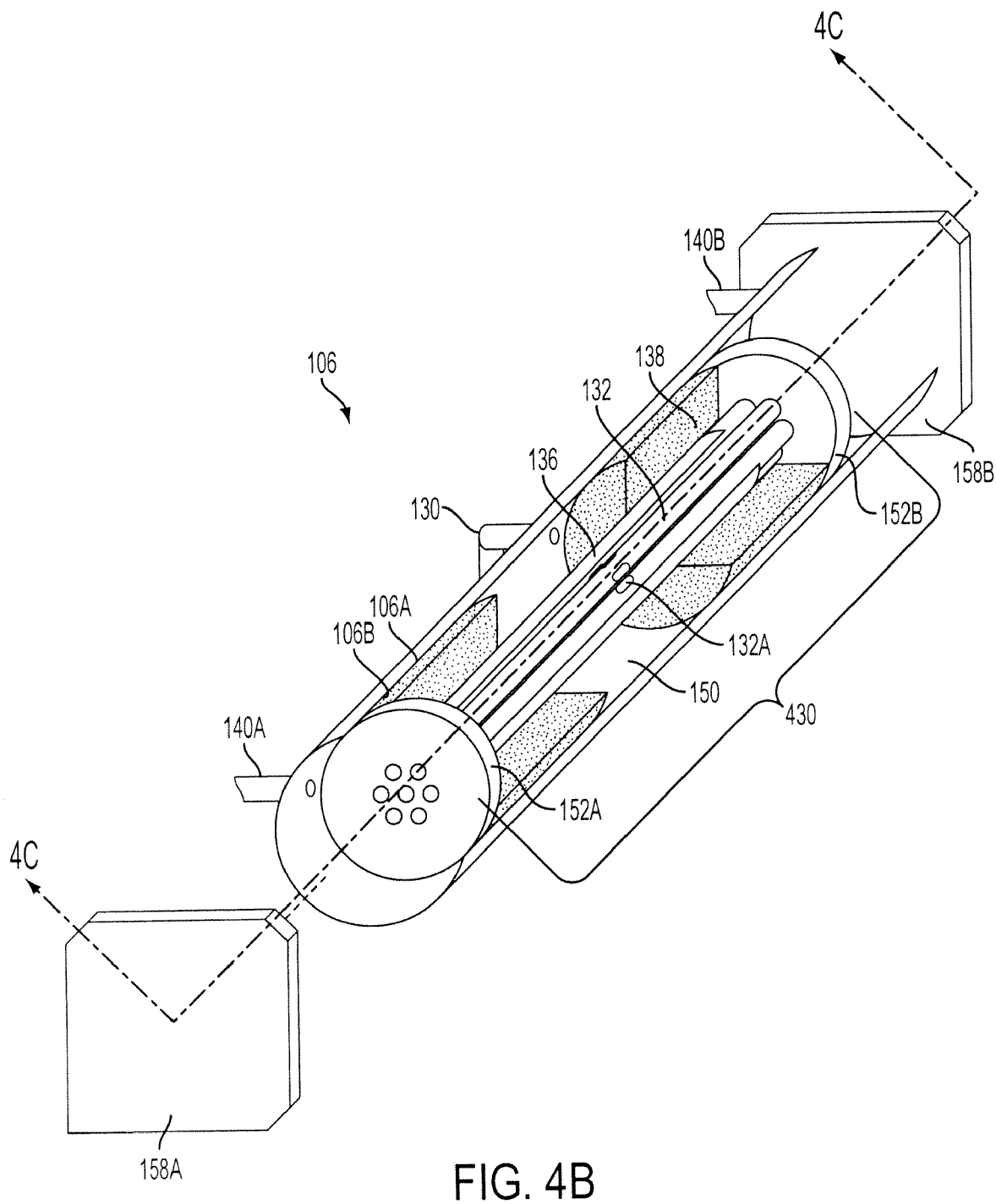
Figure 4C:
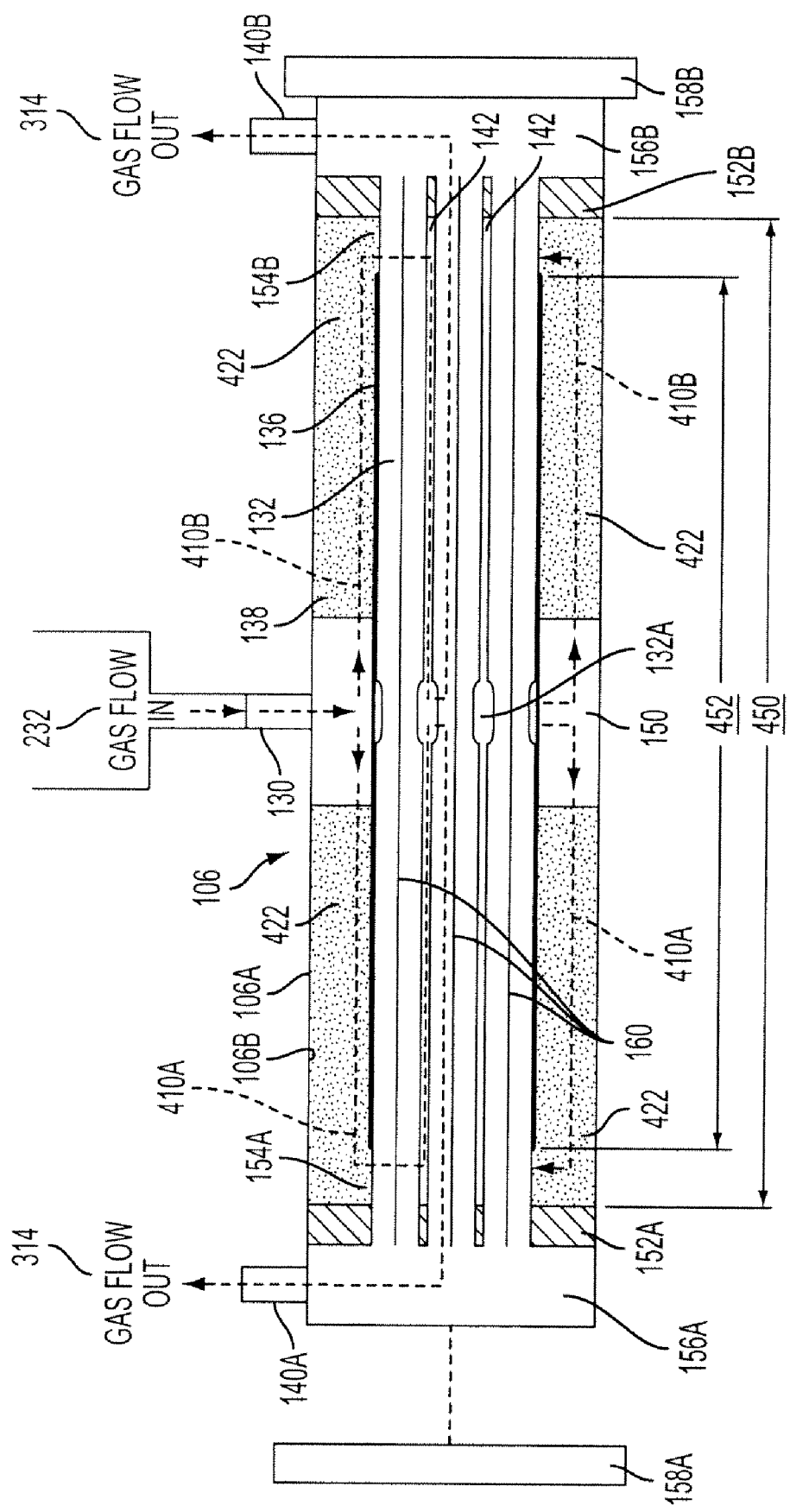
FIG. 4C is a cross sectional view of an improved MFT, in accordance aspects of embodiments of the disclosed subject matter.

FIGS. 4A and 4B are cutaway perspective views of an improved MFT 106, in accordance with aspects of embodiments of the disclosed subject matter. FIG. 4C is a cross sectional view of the improved MFT 106, in accordance aspects of embodiments of the disclosed subject matter. The MFT 106 includes multiple precipitation tubes 132, a flowsheet 136, an outer casing 106A, inlet tube 130, tube end supports 152A, 152B, end caps 158A, 158B and filter media 138. Each one of the multiple precipitation tubes 132 is an electrostatic precipitator including a center wire 160 as described in more detail below.

The multiple precipitation tubes 132 are supported on their respective ends by the tube end supports 152A, 152B. The multiple precipitation tubes 132 and the tube end supports 152A, 152B form the precipitation tube assembly 430. The tube end supports 152A, 152B locate the multiple precipitation tubes 132 such that a space 142 exists between the precipitation tubes. Each of the precipitation tubes 132 has two inlets 132A. The two inlets 132A are substantially centered lengthwise in each of the precipitation tubes 132. The two inlets 132A are on opposite sides of each of the precipitation tubes 132. It should be understood that while seven precipitation tubes 132 are shown, more or less than seven precipitation tubes could be used.

The flowsheet 136 is installed around the multiple precipitation tubes 132 as held by the tube end supports 152A, 152B. The flowsheet 136 can tangentially contact the outer surface of the precipitation tubes 132. The flowsheet 136 is shorter than the precipitation tubes 132. When the flowsheet 136 is installed around the precipitation tubes and centered lengthwise on the precipitation tubes, a gap 154A, 154B is formed between the respective end of the flowsheet 136 and the respective tube end supports 152A, 152B. The gaps 154A, 154B have a width of about equal to the width of the inlet tube 130.

The flowsheet 136 can be in the form of a tube fitted over the precipitation tubes 132. The flowsheet 136 can be one or more sheets material that are rolled or wrapped around the precipitation tubes 132. The flowsheet 136 includes at least one full circumference of the multiple precipitation tubes 132. The flowsheet 136 preferably can include more than one full circumference of the multiple precipitation tubes 132, such that the second circumference more closely resembles the cylindrical shape of the filter media 138 as described in more detail below, so as to not permit the gas flow to short circuit the filter media 138 in route to the precipitation tubes 132 through the gaps 154A, 154B.

The filter media 138 fills the volume between the flowsheet 136 and the inner surface 106B of the outer casing 106A. A slot 150 is formed in the filter media 138. The slot 150 has a width about equal to or wider than the inlet tube 130 (the slot 150 is not drawn to scale). The slot 150 extends around the circumference of the flowsheet 136 thereby creating an annular space that is aligned with the inlet tube 130 and has an inner circumference formed by the flowsheet 136 and an outer circumference formed by the inner surface 106B of the outer casing 106A.

MFT plenums 156A, 156B are formed between the respective tube end supports 152A, 152B and the MFT end caps 158A, 158B. The MFT plenums 156A, 156B are coupled to the laser window assemblies 118A, 118B by respective conduits 140A, 140B.

Figure 5:
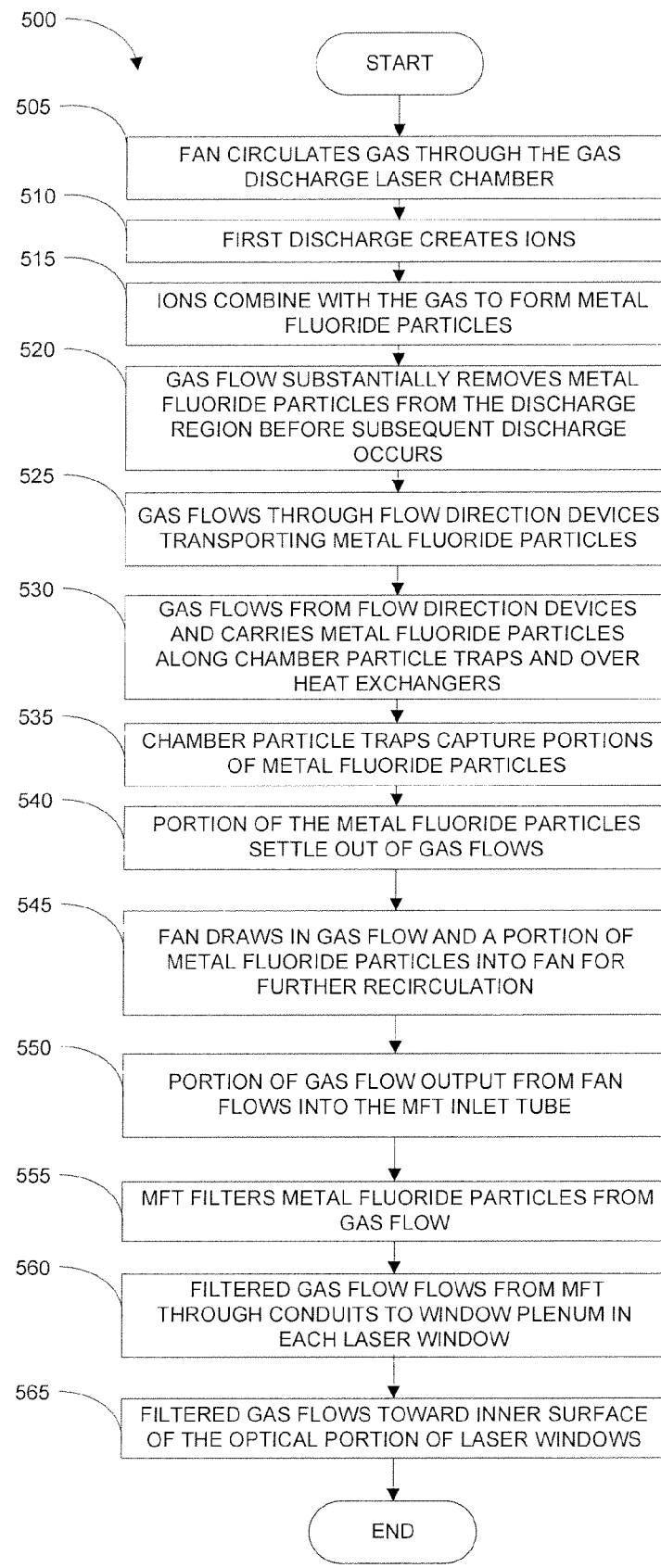
FIG. 5 is a flowchart diagram that illustrates method operations performed in distributing gas through a gas discharge laser chamber, in accordance with aspects of embodiments of the disclosed subject matter.

FIG. 5 is a flowchart diagram that illustrates the method operations 500 performed in distributing gas through gas discharge laser chamber 100, in accordance with aspects of embodiments of the disclosed subject matter. Referring now FIGS. 2, 4C and 5, in an operation 505, the fan 116 circulates gas 202 through the gas discharge laser chamber 100 and more specifically toward the discharger region 218. A first discharge creates a highly excited laser gas in the discharge region 218 including ions, some of which combine to form short lived dimers and other complexes that usually only combine under the influence of the excited gas discharge in an operation 510. The dimers and other complexes decay to a ground state in which they are no longer combined, but may still be charged, emitting photons which can get amplified in the excited gas gain medium now containing a so-called population inversion of the dimers and other complexes in their excited states. This is referred to as amplified spontaneous emission ("ASE") which can also result in fluorescence. Under defined physical and optical conditions the laser gas gain medium may be part of a resonance cavity and selectively amplify photons at or in relatively close proximity to a particular center wavelength, and generally coherent to form a laser output beam (Light from Amplification By Stimulated Emission of Radiation). Ions, particularly excited halogen ions, such as fluorine ions, bombard the electrodes and the resulting sputtered materials can then combine with fluorine to form metal halides. These reactions forming the metal halides can include forming metal fluorides in a KrF and ArF DUV excimer lasers, such as are used in micro-photolithography. The reactions forming the metal halides can be accelerated and enhanced in the excited gas discharge environment or occur later between sputtered metal and fluorine in the laser gas simply due to the high reactivity of halides with metals. This formation of metal fluoride particles 222 occurs in an operation 515.

Before a subsequent discharge occurs the gas flow 204 substantially removes the ions and other debris including the metal fluoride particles 222 from the discharge region 218 in an operation 520. The gas flow 206 through the flow direction devices 214 transports the metal fluoride particles 222, in operation 525.

In an operation 530, the gas flow 208 from the flow direction devices 214 carries the metal fluoride particles 222 along the chamber particle traps 122 and over surfaces of the heat exchangers 120. In an operation 535, the chamber particle traps 122 capture portions of the metal fluoride particles 222A, 222B.

Another portion of the metal fluoride particles 222C settle out of the gas flows 208, 210 and on the inner surfaces 102A of the gas discharge chamber 100 and the surface of the heat exchangers 120, in an operation 540. In an operation 545, the fan 116 draws the gas flow 210 and a portion of the metal fluoride particles 222D into the fan for further recirculation.

In an operation 550, a portion 232 of the gas flow output from the fan 116 flows into the MFT inlet tube 130. The portion of the gas flow 232 flowing into the MFT inlet tube 130 includes a fifth portion of the metal fluoride particles 222E. In an operation 555 the MFT 106, 106' filters the metal fluoride particles 222E from the gas flow 232.

In an operation 560, the filtered gas flow 314 flows from the MFT 106, 106' through the respective conduits 140A, 140B to the window plenum 316 in each of the laser window assemblies 118A, 118B. In an operation 565, from the window plenum 316, the filtered gas 314 flows toward the inner surface 302A of the optical portion 302 of the laser windows 118A, 118B. Flowing the filtered gas 314 toward the inner surface 302A of the optical portion 302 of the laser windows 118A, 118B prevents metal fluoride particles 222, 222F, 222G, 222H from settling on and can sweep away any metal fluoride particles that may have previously settled on the inner surface 302A of the optical portion 302 of the laser windows 118A, 118B as described above with reference to FIG. 3. The method operations can continue in operation 505 until the fan 116 is stopped. As a result, the gas 314 flowing to the windows 118A, 118B is substantially particle free. The filter media 138 increases the particle capacity of the metal fluoride trap 106 and thereby extends the service life of the gas laser discharge chamber 100. In addition a very substantial amount of debris, mostly in the form of metal halide particles is removed from circulation in the laser chamber 100 by the improved MFT 106, 106' as described in more detail below.

Figure 6:
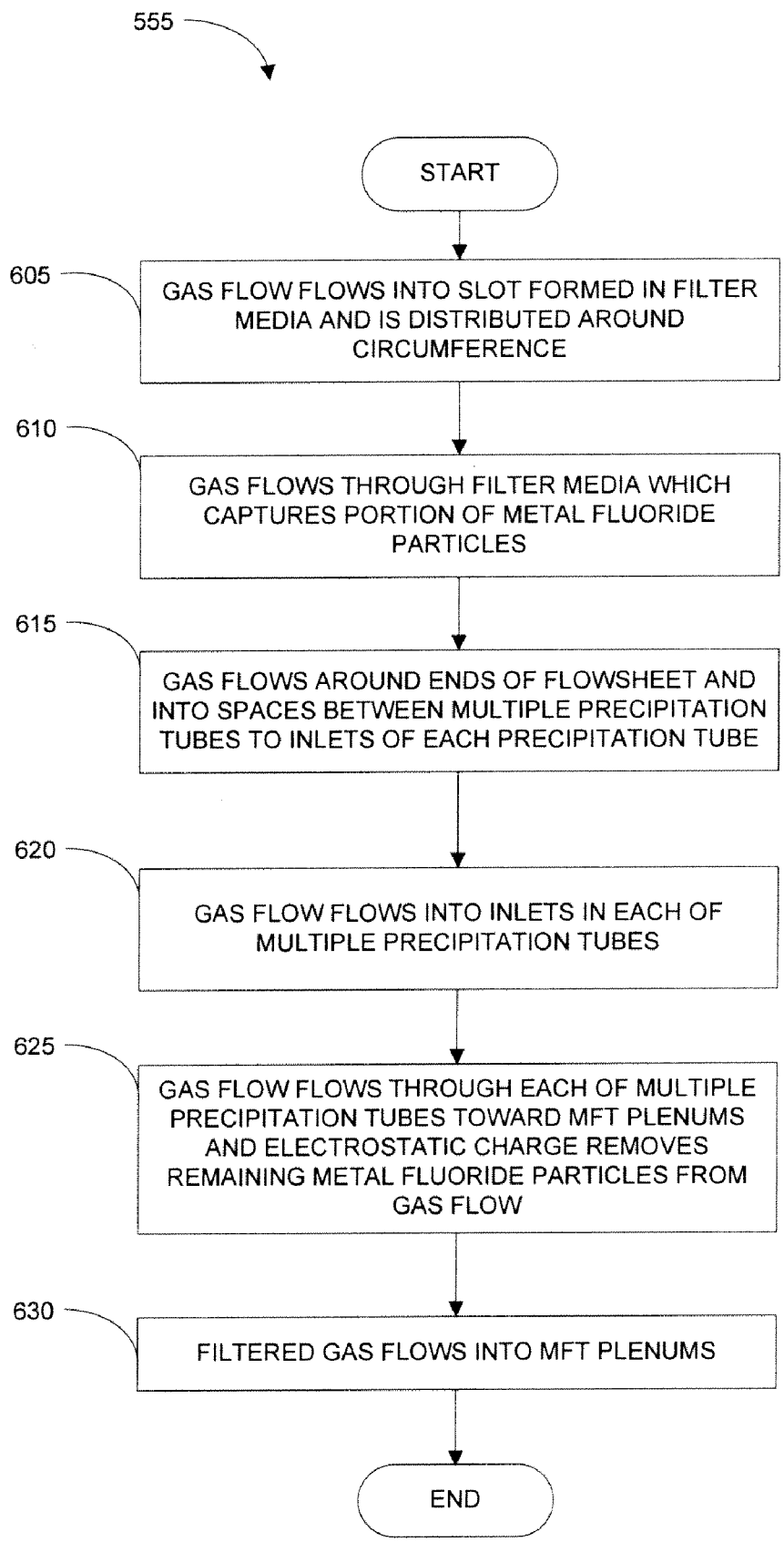
FIG. 6 is a flowchart diagram that illustrates method operations performed in filtering gas through an improved MFT, in accordance with aspects of embodiments of the disclosed subject matter.

FIG. 6 is a flowchart diagram that illustrates the method operations 555 performed in filtering gas through an improved MFT 106, 106', in accordance with aspects of embodiments of the disclosed subject matter. Referring now to FIGS. 4C and 6, in an operation 605, the gas flow 232 flows into the slot 150 formed in the filter media 138 and is distributed around the circumference of the slot. In an operation 610, the gas flow 232 flows into and through the filter media 138 in paths 410A, 410B generally parallel to the flowsheet 136 from the slot 150 toward the gaps 154A, 154B between the respective ends of the flowsheet and the tube end supports 152A, 152B. As the gas flows through the filter media 138 a portion of the metal fluoride particles 422 is trapped in the filter media 138.

In an operation 615, gas flow 232 flows around the ends of the flowsheet 136 through the gaps 154A, 154B and into the spaces 142 between the multiple precipitation tubes 132 and toward the inlets 132A in each of the multiple precipitation tubes. The gas flow 232 flows into the inlets 132A in each of the multiple precipitation tubes in an operation 620.

In an operation 625, gas flow 232 flows through each of the multiple precipitation tubes 132 toward the MFT plenums 156A, 156B. As the gas flow 232 flows through each of the multiple precipitation tubes 132 an electrostatic charge is applied to the inner surfaces of each of the precipitation tubes 132 by applying a voltage to the center wire 160 passing down the center of each of the precipitation tubes. The electrostatic charge on the inner surfaces of each of the precipitation tubes 132 draws any remaining metal fluoride particles 414 out of the gas flow 232. The metal fluoride particles 414 adhere to the inner surfaces of each of the precipitation tubes 132. In an operation 630 the filtered gas flow 314 flows into the MFT plenums 156A, 156B and the method operations can end.

The filter media 138 can include one or more types of filter media. By way of example the filter media 138 can include screen or bundled fibers or combinations thereof. The filter media 138 can be any suitable material compatible with the gases, ions and metal fluoride particles present in the gas flow 232 into the MFT 106 from the gas discharge laser chamber 100. By way of example, in an argon fluorine gas discharge laser chamber, the filter media 138 can be nickel or brass materials or alloys thereof or combinations thereof. Many metallic alloys may be used for the filter media 138 with the limitation that the selected metallic alloy is non-reactive to the gas mixture in the gas discharge laser chamber 100. By way of example, the gases in the gas discharge laser chamber 100 can include Fluorine and other gases and many metallic alloys are reactive to Fluorine and form gas phase fluorides. A few examples of such elements reactive with Fluorine include carbon, silicon, sulfur, and chromium.

The filter media 138 can include one or more porosities of filter media. By way of example the filter media 138 can include filter media that is homogenous having substantially the same porosity throughout. Alternatively, the filter media 138 can include material that has a first size of pores or screen openings in one portion of the filter media and a second size of pores or screen openings in other portions of the filter media where the first size is smaller than the second size. The filter media 138 can also include more than two porosities of filter media. By way of example, the filter media 138 can include more than three or more different porosities of filter media.

Figure 7A:
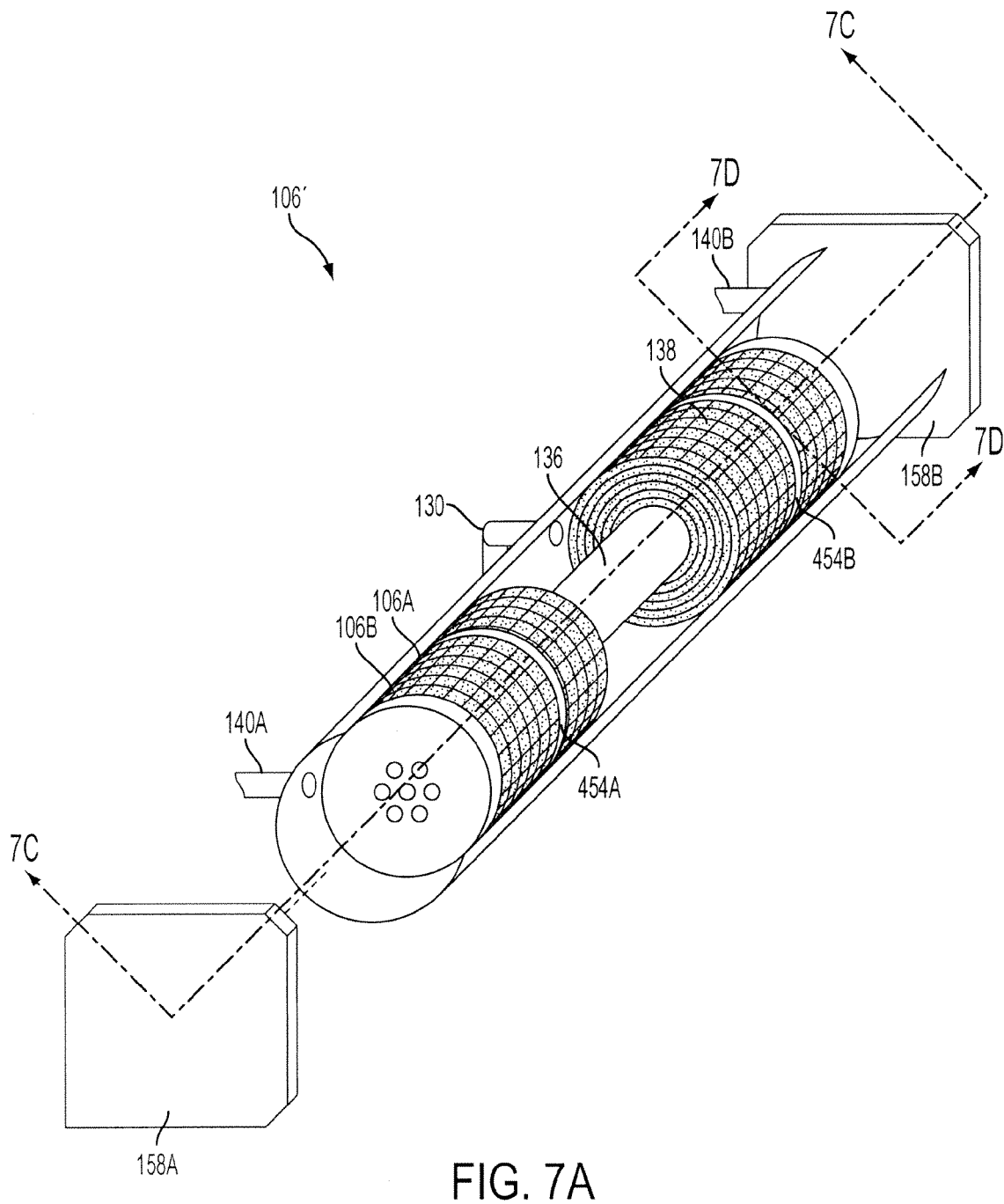
FIGS. 7A and 7B are cutaway perspective views of an improved MFT, in accordance with aspects of embodiments of the disclosed subject matter.
Figure 7B:
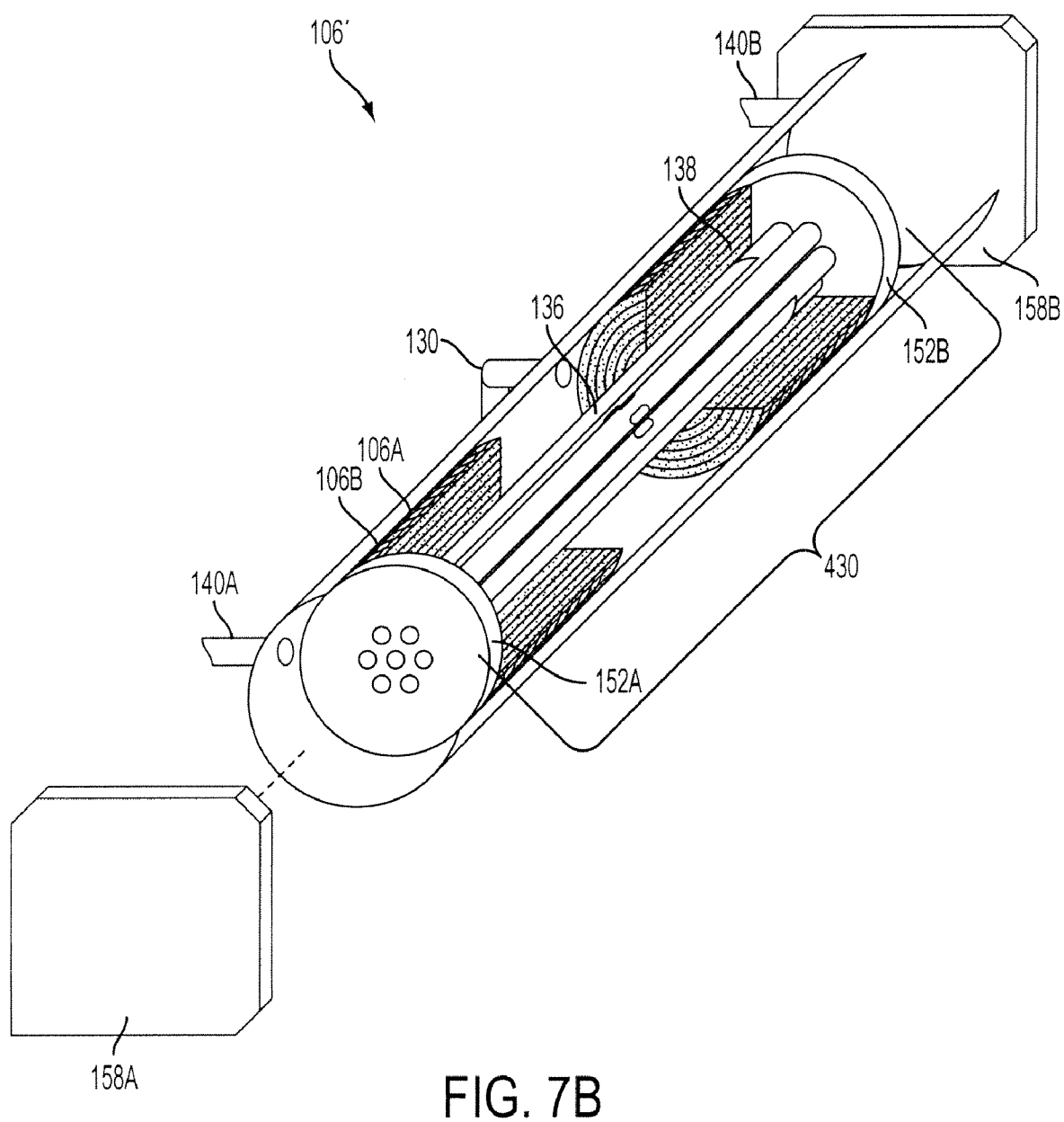
Figure 7C:
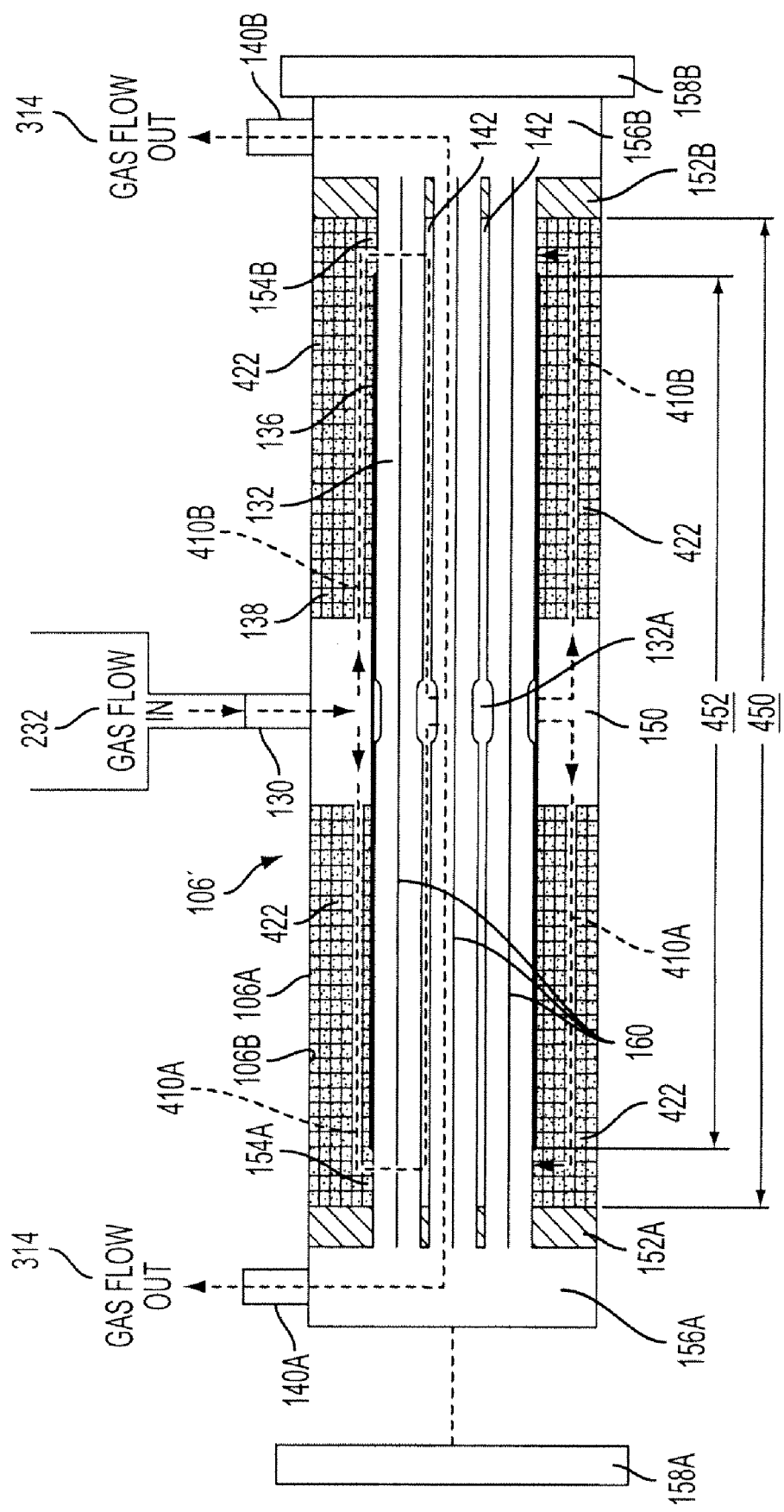
FIGS. 7C and 7D are cross sectional views of an improved MFT, in accordance with aspects of embodiments of the disclosed subject matter.
Figure 7D:
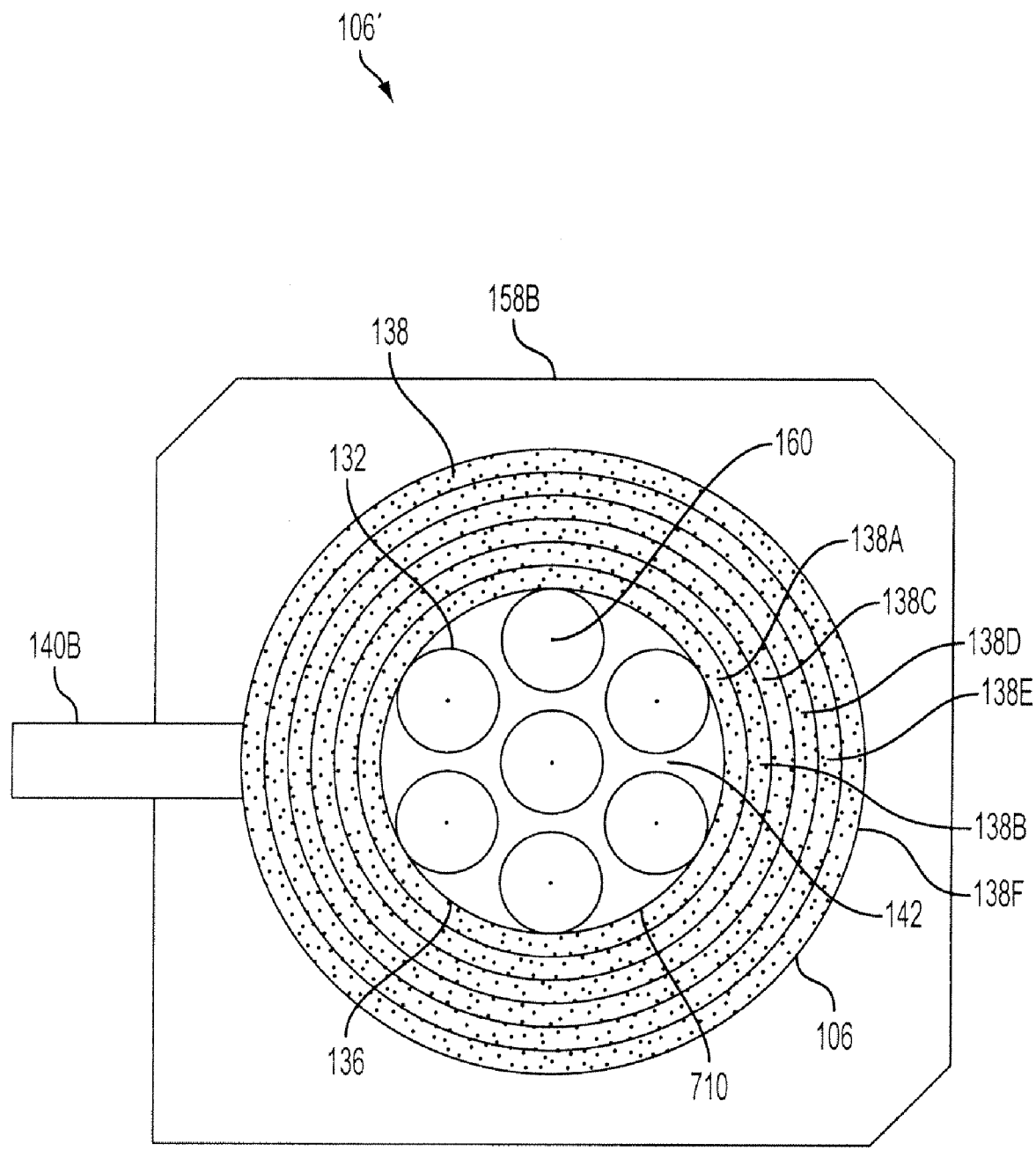

FIGS. 7A and 7B are cutaway perspective views of an improved MFT 106', in accordance with aspects of embodiments of the disclosed subject matter. FIGS. 7C and 7D are cross sectional views of an improved MFT 106', in accordance with aspects of embodiments of the disclosed subject matter. The improved MFT 106' includes layered filter media 138. The layered filter media 138 can include layers formed between the flowsheet 136 and the inner 106B surface of the outer casing 106A. By way of example, the flowsheet 136 is wrapped around a circumference 710 of the combined multiple precipitation tubes 132 and a first layer of filter media 138A is wrapped around the flowsheet 136. A second layer of filter media 138B is wrapped around the first layer of filter media 138A. A third layer of filter media 138C is wrapped around the second layer of filter media 138B. A fourth layer of filter media 138D is wrapped around the third layer of filter media 138C. A fifth layer of filter media 138E is wrapped around the fourth layer of filter media 138D. A sixth layer of filter media 138F is wrapped around the fifth layer of filter media 138E. Additional layers of filter media 138 can similarly be added.

Each of the layers of filter media 138A-F can be the same or different porosities. By way of example one or more of the layers of filter media 138A-F can have a first porosity and one or more of the remaining layers of filter media 138A-F can have a second porosity or even a third porosity. The first porosity can be a larger porosity than the second porosity or alternatively, the first porosity can be a smaller porosity than the second porosity. Where a larger porosity indicates a material with pores or openings on a size that are larger than the openings in the material having a smaller porosity. One example of porosity is described in more detail below with regard to mesh-type filter media in FIGS. 8A-8C, however it should be understood that any other type of porous material could be used where the porosity is determined by the relative sizes of the pores in the material.

The layers of filter media 138A-F can be arranged in alternating porosities. By way of example, the first layer of filter media 138A can have the first porosity and the second layer of filter media 138B can have the second porosity. The third layer of filter media 138C can have the first porosity and the fourth layer of filter media 138D can have the second porosity and so forth alternating through the multiple layers of filter media 138A-F.

Figure 8A:
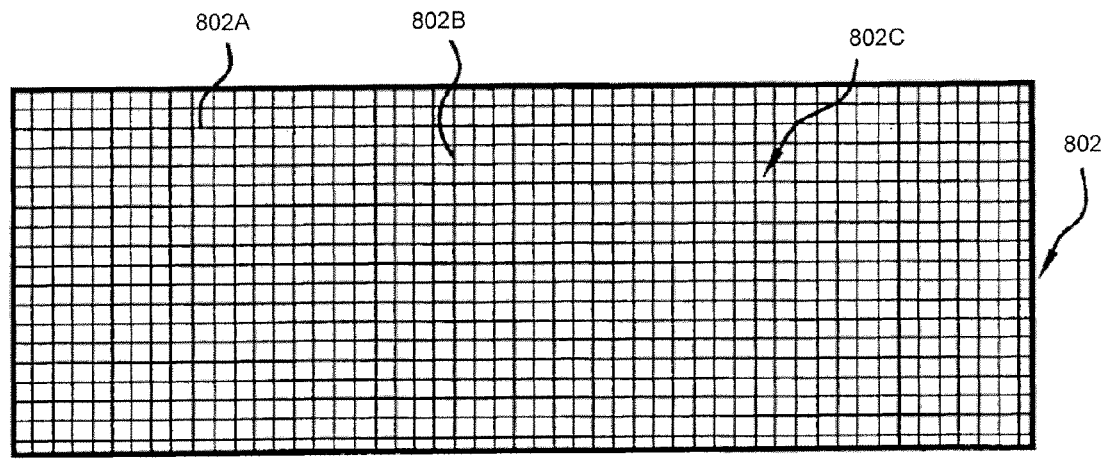
FIG. 8A is a layout view of the course mesh filter media, in accordance with aspects of embodiments of the disclosed subject matter.
Figure 8B:
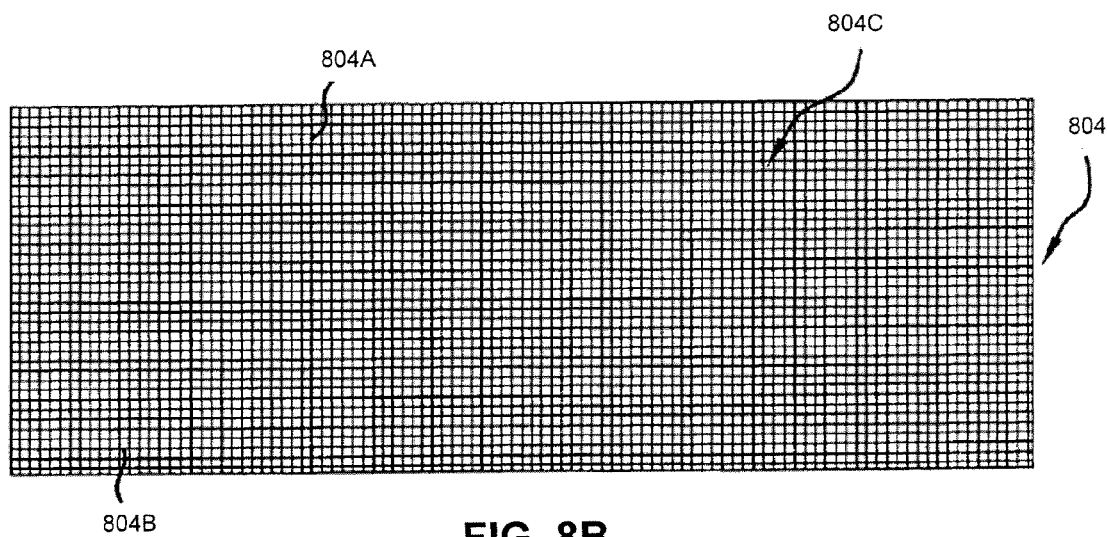
FIG. 8B is a layout view of the fine mesh filter media, in accordance with aspects of embodiments of the disclosed subject matter.
Figure 8C:
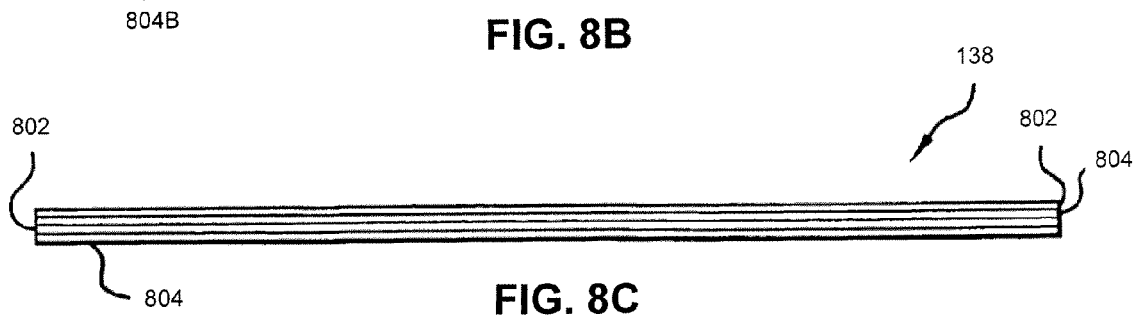
FIG. 8C is a layout view of the layered course mesh filter media and fine mesh filter media, in accordance with aspects of embodiments of the disclosed subject matter.

FIG. 8A is a layout view of a coarse mesh filter media 802, in accordance with aspects of embodiments of the disclosed subject matter. FIG. 8B is a layout view of a fine mesh filter media 804, in accordance with aspects of embodiments of the disclosed subject matter. FIG. 8C is a layout view of the layered coarse mesh filter media 802 and fine mesh filter media 804, in accordance with aspects of embodiments of the disclosed subject matter. The coarse mesh filter media 802 can be a wire mesh having a wire gauge 802A of between about 0.004 and about 0.010 inch (about 0.1 mm to about 0.25 mm) and a first pitch 802B of horizontal wires of between about 40 to about 100 wires per inch (about 40 to about 100 wires per 25 mm). The coarse mesh filter media 802 can also include a second pitch 802C of vertical wires substantially perpendicular to the horizontal wires of between about 40 to about 100 wires per inch (about 40 to about 100 wires per 25 mm).

The fine mesh filter media 804 can be a wire mesh having a wire gauge 804A of between about 0.004 and about 0.010 inch (about 0.1 mm to about 0.25 mm) and a first pitch 804B of horizontal wires of between about 50 to about 200 wires per inch (about 50 to about 200 wires per 25 mm). The fine mesh filter media 804 can also include a second pitch 804C of vertical wires substantially perpendicular to the horizontal wires of between about 50 to about 200 wires per inch (about 50 to about 200 wires per 25 mm). While the horizontal wires and vertical wires are described with respect to the coarse mesh 802 and the fine mesh 804, it should be understood that the horizontal wires and vertical wires are not required to be perpendicular and can be formed in any suitable angle and in any suitable meshed shape, e.g., triangular and/or of four or more sided shape or even a rounded shape (e.g., circular, elliptical) or other suitable pattern or substantially random shape or pitches may be employed.

FIG. 9A is a layout view of the flowsheet 136 and mesh filter media 138 assembly, in accordance with aspects of embodiments of the disclosed subject matter. FIG. 9B is a side view of the flowsheet 136 and mesh filter media 138 assembly, in accordance with aspects of embodiments of the disclosed subject matter. The flowsheet 136 is shown in a flat form and can be rolled up around the multiple precipitation tubes 132. The notch 902 is an option so that the flowsheet can be wrapped around one of the precipitation tubes 132 and the notch prevents the flowsheet from blocking the inlet 132A to the precipitation tube. The notch 902 could extend along the flow sheet 136. Alternatively, the notch 902 could include multiple notches formed along the edge 920 of the flow sheet 136. The flow sheet 136 can be wrapped around the precipitation tubes 132 more than once. The flowsheet 136 has a width 452 of less than the length of the precipitation tubes 132. By way of example, the flowsheet width 452 (as shown in FIGS. 4C and 7C above) can be about equal to the length of the precipitation tubes 132 between the tube end supports 152A, 152B less the width of the at least one inlet 132A to the precipitation tubes 132.

The flowsheet 136 has a length 906 equal to at least one full circumference 710 of the combined multiple precipitation tubes 132. By way of example, the flowsheet length 906 can include a first portion 920, a second portion 922A and a third portion 922B. The first portion 920 is capable of being wrapped around a single precipitation tube as described in more detail in FIGS. 10A and 10B below. The second portion 922A has a width 924A sufficient to wrap at least one time completely around the circumference 710 of the precipitation tubes 132 in the precipitation tube assembly 430. The third portion 922B has a width 924B sufficient to wrap at least one time around the first portion 922A and the precipitation tubes 132 in the precipitation tube assembly 430.

The mesh filter media 138 can be multiple layers. As shown in FIG. 9B the mesh filter media 138 has two layers of filter media 802 and 804. It should be understood that the mesh filter media 138 can include more than two layers of filter media. By way of example, the mesh filter media 138 can include three, four, five or six or more layers of filter media. The mesh filter media 138 can be mechanically connected to the flowsheet 136 such as by rivets, screws or a bolts or similar mechanical fastener systems. Alternatively, the filter media 138 can be mechanically connected to the flowsheet 136 by a mechanical crimping system where the flowsheet and the filter media are folded over one another and then pressed together to form a mechanical connection. The filter media 138 can be mechanically connected to the flowsheet 136 by a fusing type system such as welding, brazing or similar systems.

The mesh filter media 138 has a width substantially equal to the length 450 (as shown in FIGS. 4C and 7C above) of the precipitation tubes 132 between the tube end supports 152A, 152B. The mesh filter media 138 has a length 910 of at least three circumferences, 934A, 934B, 934C of the flowsheet 136 wrapped around the multiple precipitation tubes 132. By way of example, a first portion of the mesh filter media 932A has a width 934A sufficient to wrap at least one time completely around the circumference 710 of the precipitation tubes 132 in the precipitation tube assembly 430 and the flowsheet 136. Similarly, a second portion of the mesh filter media 932B has a width 934B sufficient to wrap at least one time completely around the circumference 710 of the precipitation tubes 132 and the flowsheet 136 and the first portion of the mesh filter media 932A. Further, a third portion of the mesh filter media 932C has a width 934C sufficient to wrap at least one time completely around the circumference 710 of the precipitation tubes 132 and the flowsheet 136 and the first and second portions of the mesh filter media 932A, 932B. The mesh filter media 138 also includes an opening 920 that when the mesh filter media 138 is rolled as described above form the slot 150 as shown in FIGS. 4A-4C and 7A-7C above.

FIG. 10A is a cross-sectional view of the multiple precipitation tubes 132, flowsheet 136 and filter media 138, in accordance with aspects of embodiments of the disclosed subject matter. FIG. 10B is a cross-sectional view of an improved MFT 106', in accordance with aspects of embodiments of the disclosed subject matter. FIG. 10A is a cross-sectional view of the improved MFT 106' as the flowsheet 136 and filter media 138 are wrapped around the multiple precipitation tubes 132 before inserting into the outer casing 106A of the MFT 106'. FIG. 10B is a cross-sectional view of the improved MFT 106' as the flowsheet 136 and filter media 138 are wrapped around the multiple precipitation tubes 132 after being inserted into the outer casing 106A of the MFT 106'. It should be understood that the spaces shown between the layers of the flowsheet 136 and filter media 138 are not drawn to scale and are shown to illustrate the differences between the layers and that the spaces shown between the layers of the flowsheet 136 and filter media 138 are actually very small or nearly non existent. It should also be understood that the differences in diameters 1040 and 1042 are not drawn to scale and the actual difference between diameter 1040 and diameter 1042 is very small such as less than about 0.25 inches (about 6.0 mm).

Figure 10C:
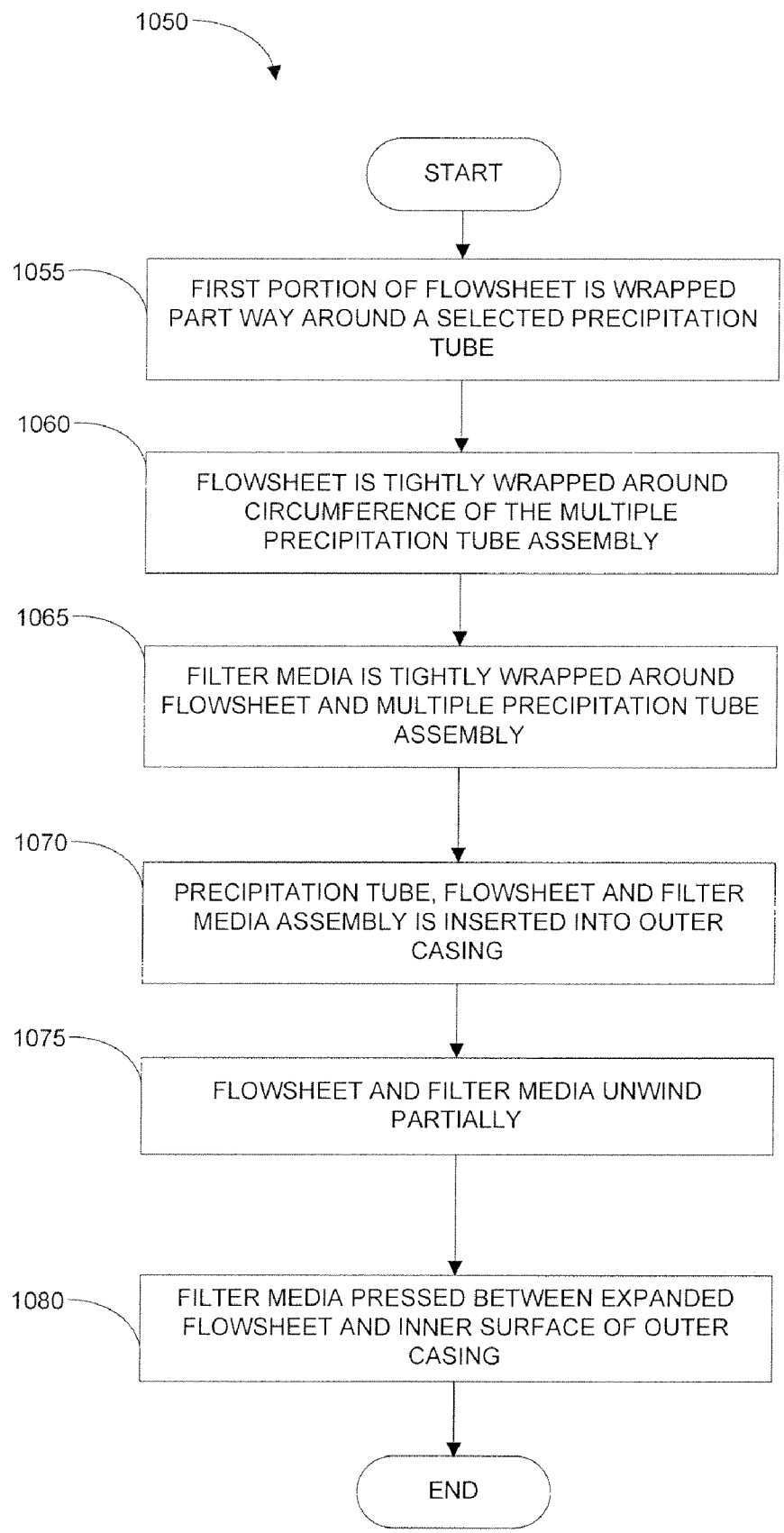
FIG. 10C is a flowchart of the method operations of assembling an improved MFT, in accordance with aspects of embodiments of the disclosed subject matter.

FIG. 10C is a flowchart of the method operations 1050 of assembling an improved MFT 106', in accordance with aspects of embodiments of the disclosed subject matter. In an operation 1055, the first portion 920 of the flowsheet 136 is wrapped at least about 90 degrees around a selected one of the multiple precipitation tubes 1032 as shown in FIG. 10A. In an operation 1060, the remaining portions 922A and 922B of the flowsheet 136 are tightly wrapped around the circumference 710 of the multiple precipitation tubes 132 to form at least one complete wrap around the multiple precipitation tubes 132 and to maintain tangential contact 1034A-1034E with at least some of the multiple precipitation tubes 132. Preferably, the flowsheet 136 is wrapped around the circumference 710 multiple precipitation tubes 132 at least twice. Alternatively, the flow sheet could be two layers of flowsheet and the two layers are wrapped at least one full circumference around the multiple precipitation tubes.

In an operation 1065, the filter media 138 is tightly wrapped around the flowsheet 136 and multiple precipitation tubes 132. The filter media 138 is wrapped around the flowsheet 136 tightly around the multiple precipitation tubes 132 to minimize the diameter 1040 of the resulting precipitation tube, flowsheet and filter media assembly 1010. The diameter 1040 is less than the inner diameter 1042 of outer casing 106A of the MFT 106'. A clamp assembly 454A, 454B can be used to hold the filter media 138 and the flowsheet 136 tightly wrapped around the multiple precipitation tubes 132.

In an operation 1070, the precipitation tube, flowsheet and filter media assembly 1010 is inserted into the outer casing 106A of the MFT 106'. In an operation 1075, the flowsheet 136 and filter media 138 are allowed to unwind partially so that the flowsheet 136 expands in diameter. The clamp assembly 454A, 454B can be removed or loosened allowing the filter media 138 and the flowsheet 136 to unwind partially. In an operation 1080, the expanded flowsheet 136 presses the filter media 138 between the expanded flowsheet 136 and the inner surface 106B of the outer casing 106A of the MFT 106'. By way of example, the third portion 922B of the flowsheet can expand outward to press the filter media 138 between the expanded flowsheet 136 and the inner surface 106B of the outer casing 106A while the second portion of the flowsheet 922A remains in tangential contact 1034A-1034E with at least some of the precipitation tubes 132.

Figure 11:
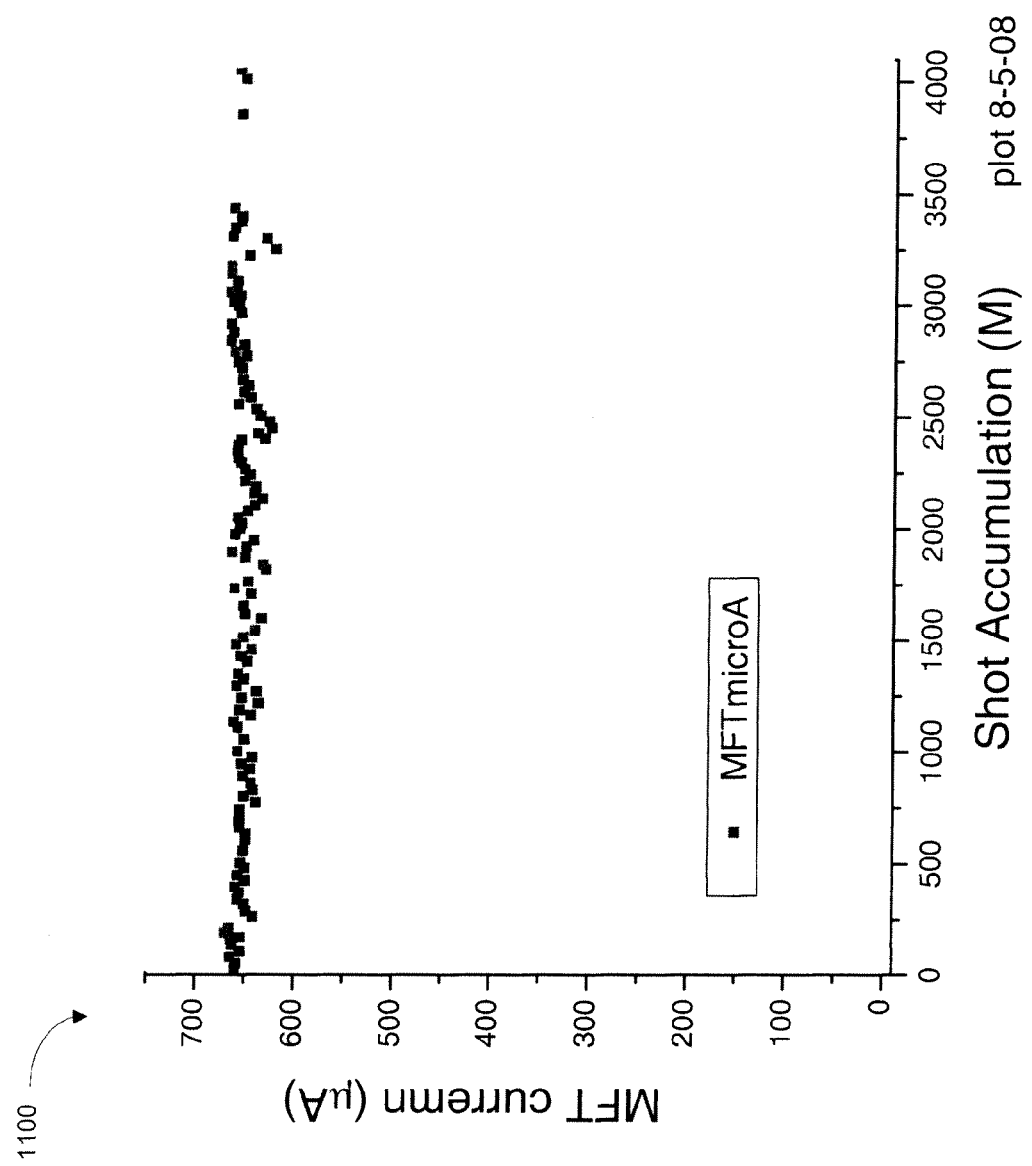
FIG. 11 is a graphical representation of the current draw in the precipitation tubes of the new MFT, in accordance with aspects of embodiments of the disclosed subject matter.

FIG. 11 is a graphical representation of a current draw in the precipitation tubes of an improved MFT 106, 106', in accordance with aspects of embodiments of the disclosed subject matter. The added filter media 138 reduces the relative rate of arrival of metal fluoride particles into the electrostatic portion of the MFT 106' of as a function of chamber operating lifetime, thus increasing the operating time to fill the MFT with metal fluoride particles (or dust or other debris), after which it becomes ineffective in protecting the chamber windows from metal fluoride particle deposition.

Each of the following U.S. patents and U.S. Published Patent applications are commonly owned by the assignee of the present application and hereby incorporated in their entirety by reference for all purposes: U.S. Pat. No. 5,018, 162, entitled "Compact Excimer Laser," by Akins et al, and U.S. Pat. No. 5,027,366, entitled "Compact Excimer Laser," by Akins et al, and U.S. Pat. No. 5,029,177, entitled "Compact Excimer Laser," by Akins et al, and U.S. Pat. No. 5,359, 620, entitled "Apparatus for, and Method of, Maintaining a Clean Window in a Laser," by Akins et al, and U.S. Pat. No. 6,018,537, entitled "Reliable, Modular, Production Quality Narrow-Band High Rep Rate F2 Laser," by Hofmann et al, and U.S. Pat. No. 6,128,323, entitled, "Reliable Modular Production Quality Narrow-Band High Rep Rate Excimer Laser", by Myers et al, and U.S. Pat. No. 6,212,211, entitled, "Shock Wave Dissipating Laser Chamber", by Azzola et al, and U.S. Pat. No. 6,330,261, entitled, "Reliable, Modular, Production Quality Narrow-Band High Rep Rate ArF Excimer Laser", by Ishihara et al, and U.S. Pat. No. 6,442,181, entitled, "Extreme repetition rate gas discharge laser", by Oliver et al, and U.S. Pat. No. 6,477,193, entitled, "Extreme Repetition Rate Gas Discharge Laser with Improved Blower Motor", by Oliver et al, and U.S. Pat. No. 6,549,551, entitled, "Injection Seeded Laser with Precise Timing Control", by Ness et al, and U.S. Pat. No. 6,553,049, entitled, "ArF Laser with Low Pulse Energy and High Rep", by Besaucele et al, and U.S. Pat. No. 6,567,450, entitled, "Very Narrow Band, Two Chamber, High Rep Rate Gas Discharge Laser System", by Myers et al, and U.S. Pat. No. 6,618,421, entitled, "High Repetition Rate Gas Discharge Laser With Precise Pulse Timing Control", by Das et al, and U.S. Pat. No. 6,625,191, entitled, "Very Narrow Band, Two Chamber, High Rep Rate Gas Discharge Laser System", by Knowles et al, and U.S. Pat. No. 6,654,403, entitled, "Flow Shaping Electrode With Erosion Pad For Gas Discharge Laser" by Ujazdowski et al, and U.S. Published Patent Application 20060291517, entitled, "High Pulse Repetition Rate Gas Discharge Laser", by Gillespie et al, and U.S. Published Patent Application 20070071058, entitled, "Gas Discharge Laser System Electrodes and Power Supply for Delivering Electrical Energy to Same", by Amada et al, and U.S. Published Patent Application 20050226301, entitled, "Gas Discharge Laser Chamber Improvements" by Partlo et al.

The present application is also related to the following U.S. patent applications that are commonly owned by the assignee of the present application and hereby incorporated in their entirety by reference for all purposes: U.S. patent application Ser. No. 12/603,486, filed on Oct. 21, 2009, entitled, "Gas Discharge Laser Chamber", by Sandstrom et al, which claims priority to U.S. Provisional Patent Application 61/107,341, filed Oct. 23, 2008, entitled, "Gas Discharge Laser Chamber", by Sandstrom et al and U.S. patent application Ser. No. 12/577,077, filed Oct. 9, 2009, entitled, "Very High Power Laser Chamber Optical Improvements" by Ye et al, which claims priority to U.S. Provisional Patent Application 61/108, 020, filed Oct. 23, 2008, entitled, "Very High Power Laser Chamber Optical Improvements", by Ye et al and to U.S. Provisional Patent Application 61/107,342, filed Oct. 21, 2008, entitled, "Very High Power Laser Chamber Optical Improvements", by Ye et al It will be further appreciated that the instructions represented by the operations in the above figures are not required to be performed in the order illustrated, and that all the processing represented by the operations may not be necessary to practice the invention.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for making a metal fluoride trap comprising:
  assembling a precipitation tube assembly including a plurality of precipitation tubes supported between a first tube end support and a second tube end support;
  assembling a precipitation tube, flowsheet and filter media assembly including:
    wrapping a flowsheet around at least one full circumference of the plurality of precipitation tubes, wherein the flowsheet has a width less than a length of the plurality of precipitation tubes between the first tube end support and the second tube end support; and
    wrapping a filter media around the wrapped flowsheet, wherein the filter media and the flowsheet are wrapped so as to have a diameter less than an inner diameter of an outer casing of the metal fluoride trap;
  inserting the precipitation tube, flowsheet and filter media assembly into the outer casing of the metal fluoride trap;
  allowing the flowsheet to expand; and
  pressing the filter media between the flowsheet and an inner surface of the outer casing of the metal fluoride trap.

2. The method of claim 1, wherein wrapping the flowsheet around at least one full circumference of the plurality of precipitation tubes includes wrapping the flowsheet around at least two full circumferences of the plurality of precipitation tubes.

3. The method of claim 1, wherein wrapping the flowsheet around at least one full circumference of the plurality of precipitation tubes includes forming at least two layers of flowsheet.

4. The method of claim 1, wherein the filter media includes a sheet of filter media.

5. The method of claim 1, wherein the filter media includes a plurality of layers of filter media.

6. The method of claim 1, wherein the filter media includes a mesh filter media.

7. The method of claim 1, wherein the filter media includes a plurality of types of filter media.

8. The method of claim 7, wherein each one of the plurality of types of filter media has a corresponding one of a plurality of porosities.

9. The method of claim 8, wherein wrapping the filter media includes wrapping alternating layers of each one of the plurality of types of filter media.

10. The method of claim 7, wherein wrapping the filter media includes wrapping a plurality of layers of filter media.

11. The method of claim 7, wherein wrapping the filter media includes wrapping at least six alternating layers of filter media.

12. The method of claim 1, wherein the filter media includes a slot.

13. The method of claim 1, wherein the flowsheet includes a notch corresponding to an inlet on at least one of the plurality of precipitation tubes.

14. The method of claim 1, wherein the filter media and the flowsheet are wrapped so as to have the diameter less than the inner diameter of the outer casing of the metal fluoride trap including installing a clamp assembly and wherein the allowing the flowsheet to expand can include releasing the clamp assembly.

15. The method of claim 1, wherein the allowing the flowsheet to expand includes maintaining a tangential contact between the flowsheet and more than one of the plurality of precipitation tubes.

16. The method of claim 1, wherein each one of the plurality of precipitation tubes includes at least one inlet in the center of the length of the precipitation tube.

17. A method of filtering gas in a metal fluoride trap comprising:
  inputting a gas flow into the metal fluoride trap;

circulating the gas flow through a slot in a filter media inside the metal fluoride trap;

flowing the gas through a filter media to a gap, wherein the gap is formed between a respective end of a flowsheet and a respective tube end support, wherein the filter media captures at least a portion of a quantity of particles in the gas flow;

flowing the gas through a plurality of spaces formed between a plurality of precipitation tubes toward at least one inlet in each one of the plurality of precipitation tubes;

flowing the gas into the at least one inlet in each one of the plurality of precipitation tubes;

flowing the gas inside each one of the plurality of precipitation tubes;

applying an electrical charge to the inner surface of each one of the plurality of precipitation tubes, wherein any remaining particles in the gas flow attach to the inside surface of each one of the plurality of precipitation tubes; and outputting a filtered gas flow from at least one outlet of the metal fluoride trap.

18. A metal fluoride trap comprising:

a precipitation tube assembly including a plurality of precipitation tubes supported between a first tube end support and a second tube end support;

a precipitation tube, flowsheet and filter media assembly including:

a flowsheet wrapped around at least one full circumference of the plurality of precipitation tubes, wherein the flowsheet has a width less than a length of the plurality of precipitation tubes between the first tube end support and the second tube end support; and a filter media wrapped around the wrapped flowsheet, wherein the filter media and the flowsheet are wrapped so as to have a diameter less than an inner diameter of an outer casing of the metal fluoride trap;

wherein the precipitation tube, flowsheet and filter media assembly are encased within the outer casing of the metal fluoride trap and wherein the filter media is pressed between the flowsheet and an inner surface of the outer casing of the metal fluoride trap.

* * * * *